(12) United States Patent
Cairns et al.

(10) Patent No.: US 12,548,648 B2
(45) Date of Patent: Feb. 10, 2026

(54) METHOD OF TREATMENT OR PROPHYLAXIS

(71) Applicant: POLYGENRX PTY LTD, Surry Hills (AU)

(72) Inventors: Murray Cairns, Waratah (AU); William Reay, Hinton (AU)

(73) Assignee: POLYGENRX PTY LTD, Surry Hills (AU)

( * ) Notice: Subject to any disclaimer, the term of this patent is extended or adjusted under 35 U.S.C. 154(b) by 526 days.

(21) Appl. No.: 17/614,265

(22) PCT Filed: May 29, 2020

(86) PCT No.: PCT/AU2020/050540
§ 371 (c)(1),
(2) Date: Nov. 24, 2021

(87) PCT Pub. No.: WO2020/237314
PCT Pub. Date: Dec. 3, 2020

(65) Prior Publication Data
US 2022/0172811 A1    Jun. 2, 2022

(30) Foreign Application Priority Data
May 30, 2019   (AU) .............................. 2019901861

(51) Int. Cl.
*G16H 20/00*   (2018.01)
*G16B 20/20*   (2019.01)
(Continued)

(52) U.S. Cl.
CPC ............ *G16H 20/00* (2018.01); *G16B 20/20* (2019.02); *G16B 50/10* (2019.02); *G16H 10/20* (2018.01); *G16H 10/40* (2018.01)

(58) Field of Classification Search
None
See application file for complete search history.

(56) References Cited

U.S. PATENT DOCUMENTS

2013/0166320 A1* 6/2013 Kupershmidt ......... G16B 20/20
705/3

FOREIGN PATENT DOCUMENTS

CN    114514329 A * 5/2022 ............... G16B 5/00
WO    13006857 A1    1/2013
(Continued)

OTHER PUBLICATIONS

Aterido, A. et al.: "Genetic variation at the glycosaminoglycan metabolism pathway contributes to the risk of psoriatic arthritis but not psoriasis", Annals of the Rheumatic Diseases, 2018.
(Continued)

*Primary Examiner* — Robert W Morgan
*Assistant Examiner* — Edward B Winston, III
(74) *Attorney, Agent, or Firm* — Brooks Kushman P.C.

(57) ABSTRACT

Disclosed herein are methods for treating complex disorders in human subjects and for preventing complex disorders in human subjects at risk of developing the disorder, including identifying one or more pharmacologically relevant biological pathways associated with a complex disorder and selecting an agent suitable for the treatment or prevention of the complex disorder. As described herein, the quantification of common variant enrichment in biological pathways with known drug targets provides a means of functionally annotating genome-wide polygenic risk scoring, which provides an indication of an individual's exposure to risk variants that are potentially treatable using existing pharmaceutical agents, dietary supplements or lifestyle interventions.

18 Claims, 10 Drawing Sheets

(51) Int. Cl.
*G16B 50/10* (2019.01)
*G16H 10/20* (2018.01)
*G16H 10/40* (2018.01)

(56) References Cited

FOREIGN PATENT DOCUMENTS

| WO | WO-2013006857 A1 * | 1/2013 | ........... C12Q 1/6883 |
| WO | 13055683 A1 | 4/2013 | |
| WO | WO-2013055683 A1 * | 4/2013 | .............. A61P 25/28 |
| WO | WO-2018075332 A1 * | 4/2018 | ................ G16B 5/00 |

OTHER PUBLICATIONS

Gaspar, H.A. et al.: "Using genetic drug-target networks to develop new drug hypotheses for major depressive disorder", Translational Psychiatry, vol. 9, No. Article 117, Mar. 2019.

Grenler, L. et al.: "Computational drug repurposing for inflammatory bowel disease using genetic information", Computational and Structural Biotechnology Journal, vol. 17, Jan. 2019 (Jan. 1, 2019), pp. 127-135.

Marquez, A. et al.: "Meta-analysis of Immunochip data of four autoimmune diseases reveals novel single-disease and cross-phenotype associations", Genome Medicine, vol. 10, No. Article 97, 2018.

Okada, Y. et al.: "Genetics of rheumatoid arthritis contributes to biology and drug discovery", Nature, vol. 506, 2014, pp. 376-381.

Wain, L.V. et al.: "Genome-wide association analyses for lung function and chronic obstructive pulmonary disease dentify new loci and potential druggable targets", Nature Genetics, vol. 49, 2017, pp. 416-425.

Warren, H.R. et al.: "Genome-wide association analysis identifies novel blood pressure loci and offers biological insights into cardiovascular risk", Nature Genetics, vol. 49, 2017, pp. 403-415.

International Search Report PCT/AU2020/050540, Prepared by the AU Patent Office, mailing date Aug. 11, 2020, 5 pages.

\* cited by examiner

FIG. 5A
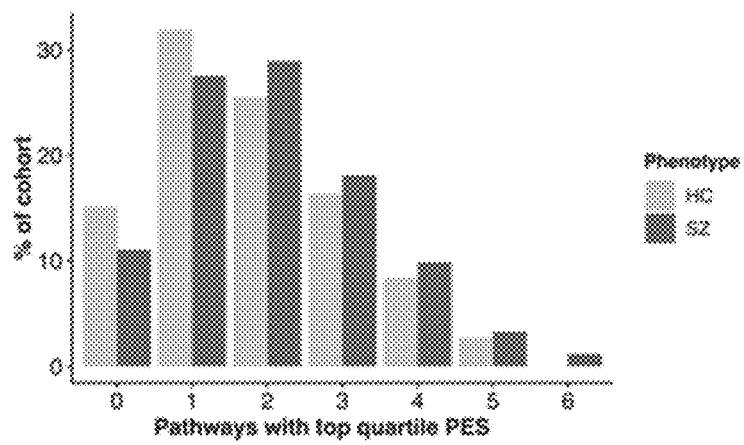
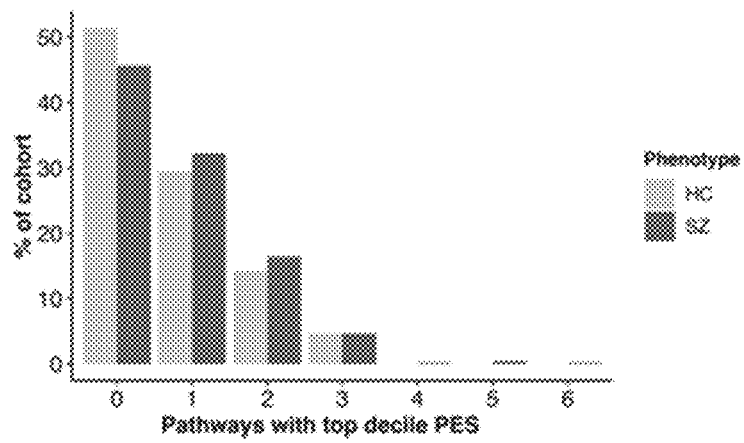
FIG. 5B

FIG. 7A
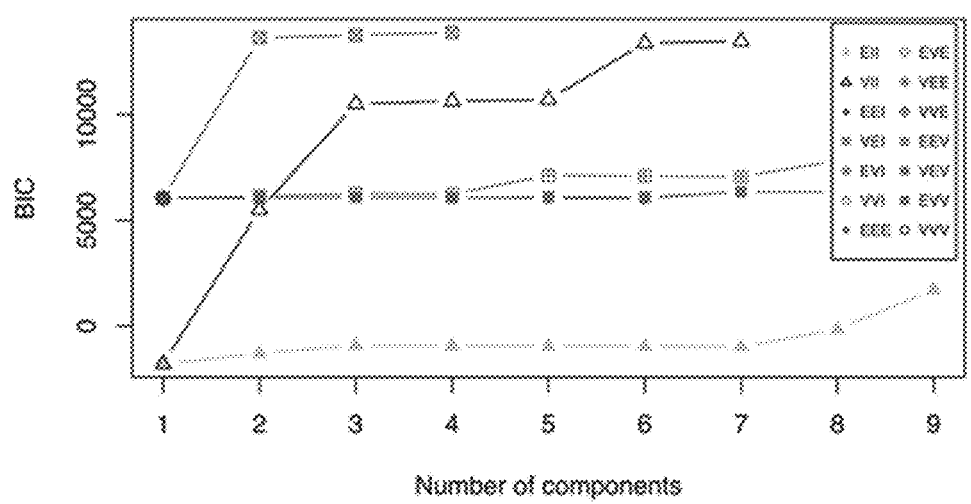
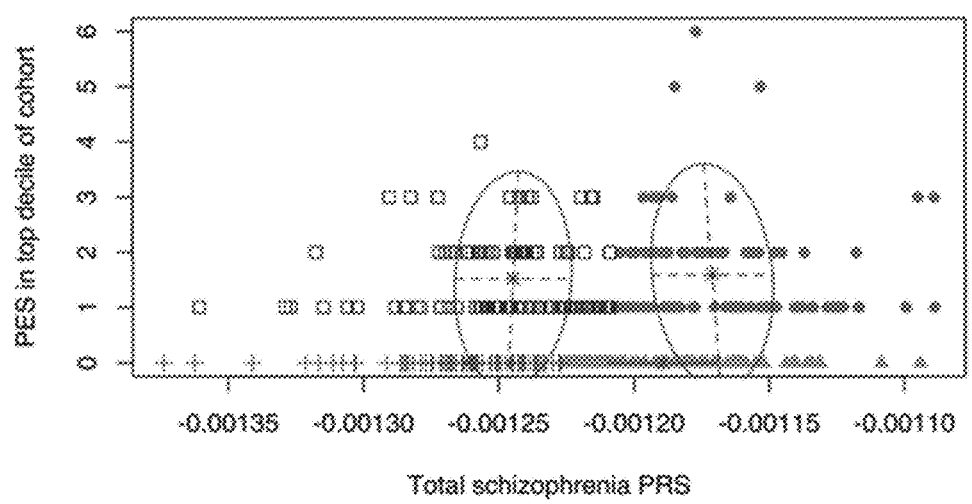
FIG. 7B

METHOD OF TREATMENT OR PROPHYLAXIS

CROSS-REFERENCE TO RELATED APPLICATION

This application is the U.S. national phase of PCT Application No. PCT/AU2020/050540 filed on May 29, 2020, which claims priority to AU Patent Application No. 2019901861 filed on May 30, 2019, the disclosures of which are incorporated in their entirety by reference herein.

FIELD

This disclosure relates generally to methods for treating or preventing complex disorders in a human subject, comprising identifying one or more pharmacologically relevant biological pathways associated with the disorder and selecting an agent suitable for the treatment or prevention of the complex disorder in the subject.

BACKGROUND

A significant burden of disease is caused by complex traits including psychiatric and neurobehavioral disorders, inflammatory and autoimmune disorders, metabolic and cardiovascular disease, and cancer. Until relatively recently it was difficult to identify the heritable components of these traits, however, the emergence of well powered genome-wide association studies (GWAS) of large cohorts assembled by collaborative consortia are revealing important insights into their common variant architecture. While collectively this information has been vital to map genes and pathways that are likely to be etiological factors, the small effect size of individual variants, and their heterogeneity in the population make their relevance to individuals with the disorder highly variable, relatively specific, and fairly minor with respect to the total variant burden. In other words, the individual variants present as relatively small targets for therapeutic intervention and in many disorders may not attract the investment needed for pharmaceutical development. Therefore, mechanisms for using this the vast amount of diverse genetic information are required to maximize its utility for therapeutic advances. This requires a personalized approach that can capture variant burden in affected individuals with respect to biological components that align with existing medications, and/or pathways of relevance to key pathophysiological processes, to provide sufficient support for the development of new interventions.

Approaches that summate the genomic risk burden, such as polygenic risk scoring (PRS), have demonstrated a significant association with many complex traits in cohort studies such as neuropsychiatric disorders (Purcell et al., 2009, *Nature*, 460: 748-752), diabetes (Xu et al., 2018, *Nature Communications*, 9: 2941), cardiovascular disease (Khera et al., 2018, *Nature Genetics*, 50: 1219-1224), and inflammatory disorders (Cleynen et al., 2016, *The Lancet*, 387: 156-167). In the PRS model, individual alleles are weighted by their associations effect size related to a given phenotype generated in well-powered GWAS. Cumulative burden of common variation can therefore be quantified in patients via this methodology. Importantly, PRS has shown the most utility when incorporating variants at less strict thresholds than genome wide significance ($P<5\times10^{-8}$), that is, a higher degree of captured polygenicity (Purcell et al., 2009, supra). Recent analyses have also shown that individuals in the population with very high PRS can have a greater than three-fold risk increase for a number of complex conditions (Khera et al., 2018, supra).

A key limitation of genome-wide PRS is its composition of heterogeneous risk factors that lack biological salience and cannot provide specific information that might help in designing a precision treatment strategy. Accordingly, there is an ongoing need to develop methods to provide biological relevance to genome-wide PRS that can provide actionable outcomes for the treatment or prevention of complex disorders.

SUMMARY

This disclosure is predicated, in part, on the surprising finding that the quantification of common variant enrichment in biological pathways with known drug targets provides a means of functionally annotating genome-wide PRS, which provides an indication of an individual's exposure to risk variants that are potentially treatable using existing pharmaceutical agents, dietary supplements or lifestyle interventions. This finding has been reduced to practice in a method for treating a complex disorder in a human subject or preventing a complex disorder in a human subject at risk of developing the complex disorder.

Accordingly, in one aspect, the present disclosure provides a method for treating a complex disorder in a human subject comprising:
a. identifying one or more pharmacologically-relevant biological pathways comprising the steps of:
 i. obtaining data representing genome-wide variants from a plurality of individuals with the complex disorder and a plurality of individuals without the complex disorder;
 ii. selecting a plurality of groups of variants significantly associated with the complex disorder, wherein each group of variants is identified using a plurality of P value thresholds ($P_T$);
 iii. performing gene set association analysis on each of the plurality of groups of variants to identify gene sets enriched for variants significantly associated with the complex disorder;
 iv. for each of the identified gene sets, generating a plurality of annotations corresponding to a plurality of predefined annotation categories, wherein the plurality of predefined annotation categories comprise a biological pathways annotation category, a drug target annotation category and a therapeutic agent annotation category; and
 v. identifying one or more pharmacologically-relevant biological pathways, wherein the pharmacologically-relevant biological pathways comprise an annotated biological pathway, an annotated drug target and at least one annotated therapeutic agent;
b. selecting a therapeutic agent for the treatment of the complex disorder in the subject comprising:
 i. obtaining data representing genome-wide variants in a biological sample from the subject;
 ii. calculating a predictive polygenic score for the pharmacologically-relevant biological pathways identified in step (a)(v) from the subject's genome wide variants data using each of the plurality of $P_T$ in step (a)(ii); and
 iii. selecting at least one therapeutic agent from the treatment of the complex disorder, wherein a predictive polygenic score that is elevated relative to a reference value indicates that the subject may be sensitive to the at least one annotated therapeutic agent, and c. treating the subject with the selected therapeutic agent.

In another aspect, the present disclosure provides a method for preventing a complex disorder in a human subject at risk of developing the complex disorder comprising:

a. identifying one or more pharmacologically relevant biological pathways comprising the steps of:
  i. obtaining data representing genome-wide variants from a plurality of individuals with the complex disorder and a plurality of individuals without the complex disorder;
  ii. selecting a plurality of groups of variants significantly associated with the complex disorder, wherein each group of variants is identified using a plurality of P value thresholds ($P_T$);
  iii. performing gene set association analysis on each of the plurality of groups of variants to identify gene sets enriched for variants significantly associated with the complex disorder;
  iv. for each of the identified gene sets, generating a plurality of annotations corresponding to a plurality of predefined annotation categories, wherein the plurality of predefined annotation categories comprise a biological pathways annotation category, a drug target annotation category, a therapeutic agent annotation category, a dietary supplement annotation category and a lifestyle intervention annotation category; and
  v. identifying one or more pharmacologically relevant biological pathways, wherein the pharmacologically relevant biological pathways comprise an annotated biological pathway and an annotated drug target;
b. selecting a treatment to prevent the development of the complex disorder comprising the steps of:
  i. obtaining data representing genome-wide variants in a biological sample from the subject;
  ii. calculating a predictive polygenic score for the pharmacologically-relevant biological pathways identified in step (a)(v) from the subject's genome wide variants data using each of the plurality of $P_T$ in step (a)(ii); and
  iii. identifying a subject as being at risk of developing the complex disorder, wherein a predictive polygenic score that is elevated relative to a reference value indicates that the subject may be at risk of developing the complex disorder, wherein the pharmacologically relevant biological pathways with a predictive polygenic score that is elevated relative to a reference value have at least one additional annotation selected from the group a therapeutic agent annotation, a dietary supplement annotation and a lifestyle intervention annotation, and
c. treating the subject with one or more of the annotated therapeutic agent, dietary supplement or lifestyle intervention to prevent the development of the complex disorder.

In another aspect, the present disclosure provides a computer-based genomic annotation system comprising non-transitory memory configured to store instructions and at least one processor coupled with the memory, the processor configured to:

a. receive genome-wide variant data from a plurality of individuals with a complex disorder and a plurality of individuals without a complex disorder;

b. processing the genome-wide variant data to select a plurality of groups of variants significantly associated with the complex disorder, wherein each group of variants is identified using a plurality of P value thresholds ($P_T$);

c. performing gene set association analysis on each of the plurality of groups of variants to identify gene sets enriched for variants significantly associated with the complex disorder;

d. for each of the identified gene sets, generating a plurality of annotations corresponding to a plurality of predefined annotation categories, wherein the plurality of predefined annotation categories comprise a biological pathways annotation category, a drug target annotation category and an approved therapeutic agent annotation category; and e. identifying one or more pharmacologically relevant biological pathways, wherein the pharmacologically relevant biological pathways comprise an annotated biological pathway, an annotated drug target and at least one annotated approved therapeutic agent.

BRIEF DESCRIPTION OF THE DRAWINGS

Embodiments of the disclosure are described herein, by way of non-limiting example only, with reference to the accompanying drawings.

FIGS. 5A and 5B are graphical representations of the distribution of schizophrenia and healthy control patients with multiple elevated pharmagenic enrichment scores. PES in each pathway in the top quartile (A) or decile (B) of the ASRB cohort are classified as high and the number of scores over this threshold counted in each individual, represented here as a percentage of each phenotype cohort (that is, SZ or HC). The highest number of top quartile or decile PES scores in an individual is six (only schizophrenia patients). SZ=schizophrenia, HC=healthy controls.

FIGS. 7A and 7B show the clustering of genome wide PRS and the individual count of elevated pharmagenic enrichment score using finite Gaussian mixture modelling. (A) A graphical representation of the number of clusters (x-axis) against the Bayesian information criterion (y-axis; BIC). The scale represents the fourteen different Gaussian models tested for parametrization of the within-group covariance matrix. (B) A graphical representation of derived clusters of genome wide schizophrenia PRS (x-axis; Total PRS) against the number of PES in the top decile of the ASRB cohort per individual (y-axis). Boxes=Cluster 1, circles=Cluster 2, triangles=Cluster 3, crosses=Cluster 4.

DETAILED DESCRIPTION

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. All patents, patent applications, published applications and publications, databases, websites and other published materials referred to throughout the entire disclosure, unless noted otherwise, are incorporated by reference in their entirety. In the event that there is a plurality of definitions for terms, those in this section prevail. Where reference is made to a URL or other such identifier or address, it is understood that such identifiers can change and particular information on the internet can come and go, but equivalent information can be found by searching the internet. Reference to the identifier evidences the availability and public dissemination of such information.

The articles "a", "an" and "the" include plural aspects unless the context clearly dictates otherwise. Thus, for example, reference to "an agent" includes a single agent, as well as two or more agents; reference to "a treatment" includes a single treatment, as well as two or more treatments; and so forth.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Figure 1A:
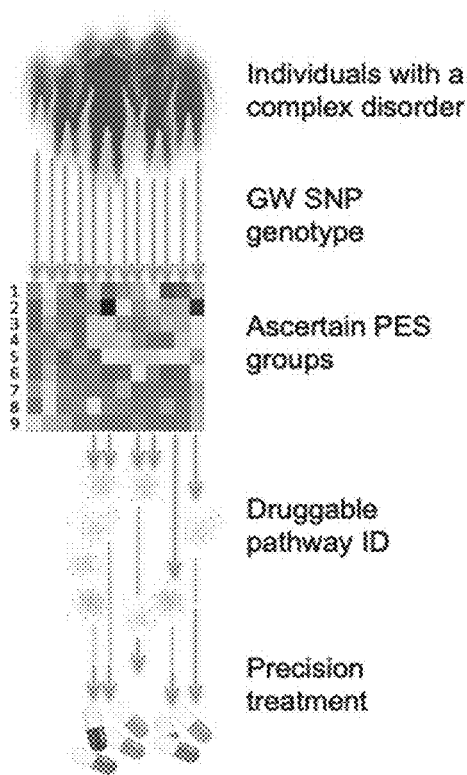
FIGS. 1A and 1B are schematic representations of the implementation of pharmagenic enrichment score (PES) in precision treatment and prophylaxis. (A) Using the PES framework individuals with a complex disorder provide DNA for common variant SNP genotyping, which is used to ascertain individuals with a high PES. The PES groups (heat map rows 1-9, with enrichment denoted by darker color) intrinsically identify precision treatment options tailored to the individual's biological enrichment (of pathways with known drug targets) for polygenic risk in that pathway. (B) Using the PES for prophylactic intervention for individuals in the population at a high polygenic risk for a variety of complex traits with clinical actionability (heat map rows A-I, with high PRS denoted by darker color). Conservative prophylactic measures in this context may account for environment risk exposure and focus on lifestyle interventions, such as diet and exercise, rather than pharmaceutical treatments that may not be justified without symptom presentation because of their side effect and/or cost.
Figure 1B:
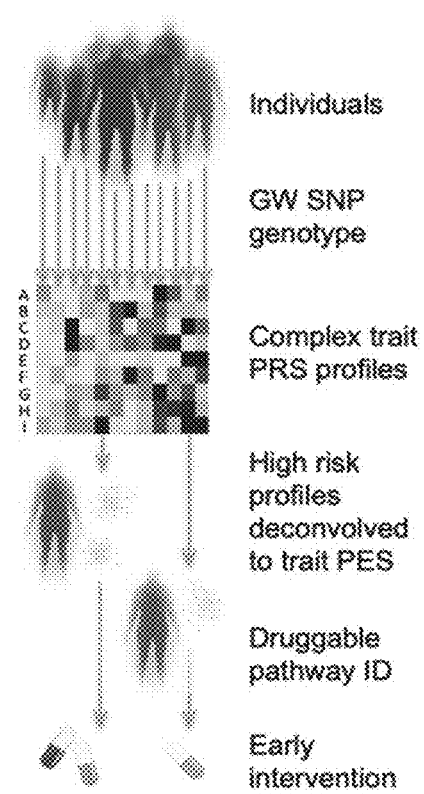

The drug development pipeline continues to be prohibitively expensive and time consuming in the translation of novel compounds for clinical practice. Repositioning of previously approved drugs for other human health conditions can be a more readily achievable action, particularly for rare disorders where a causal factor can be identified. However, in complex disorders, such as schizophrenia, this approach is hindered by the complexity of the pathophysiology and heterogeneity of genomic risk, along with inter-individual variability in illness onset and clinical course. Annotation of the individually relevant (personalized) genetic components associated with complex syndromes, for delineating clinically meaningful biological systems, will both better target existing treatments and reveal novel opportunities for drug repurposing (FIG. 1). As described herein, a novel method for capturing common variant risk in biological networks with known drug interactions—pharmagenic enrichment scores (PES)—has been developed to facilitate precision treatment design relevant to individuals with a particular set of risk variants. A distinct advantage of the PES approach of the present disclosure is that it can capture latent enrichment of polygenic signal in pathways relevant to pharmaceutical actions, among individuals whose overall trait PRS is low relative to others with a shared phenotype. Even in cases where polygenic burden is high, genome-wide PRS (as a biologically unannotated instrument) does not necessarily provide insight into pathways suitable for pharmacological intervention in individuals. The approach described herein for selection of putative drug targets exemplified in schizophrenia GWAS has revealed potential targets for drug repurposing, with potential clinical utility.

In an aspect, the present disclosure provides a method for treating a complex disorder in a human subject comprising:
a. identifying one or more pharmacologically-relevant biological pathways comprising the steps of:
   i. obtaining data representing genome-wide variants from a plurality of individuals with the complex disorder and a plurality of individuals without the complex disorder;
   ii. selecting a plurality of groups of variants significantly associated with the complex disorder, wherein each group of variants is identified using a plurality of P value thresholds ($P_T$);
   iii. performing gene set association analysis on each of the plurality of groups of variants to identify gene sets enriched for variants significantly associated with the complex disorder;
   iv. for each of the identified gene sets, generating a plurality of annotations corresponding to a plurality of predefined annotation categories, wherein the plurality of predefined annotation categories comprise a biological pathways annotation category, a drug target annotation category and a therapeutic agent annotation category;
   v. identifying one or more pharmacologically-relevant biological pathways, wherein the pharmacologically-relevant biological pathways comprise an annotated biological pathway, an annotated drug target and at least one annotated therapeutic agent; and
b. selecting a therapeutic agent for the treatment of the complex disorder in the subject comprising:
   i. obtaining data representing genome-wide variants in a biological sample from the subject;

ii. calculating a predictive polygenic score for the pharmacologically-relevant biological pathways identified in step (a)(v) from the subject's genome wide variants data using each of the plurality of $P_T$ in step (a)(ii); and iii. selecting at least one approved therapeutic agent from the treatment of the complex disorder, wherein a predictive polygenic score that is elevated relative to a reference value indicates that the subject may be sensitive to the at least one annotated therapeutic agent, c. treating the subject with the selected therapeutic agent.

Complex Disorders

The term "complex disorder" as used herein refers to disorders caused by the effect of multiple genes that do not follow the same predicted pattern of inheritance seen in single gene (i.e., Mendelian) disorders. Complex disorders result from the complex interplay of genes and environment. Therefore, a subject will have a complex disorder if they have the right combination of genetic differences and environmental exposures. Complex disorders would be known to persons skilled in the art, illustrative examples of which include schizophrenia, major depressive disorder, heart disease, diabetes, multiple sclerosis, Alzheimer's disease, autism, Parkinson's disease, asthma and metabolic disorder.

In an embodiment, the complex disorder is selected from the group consisting of diabetes, multiple sclerosis, schizophrenia, bipolar disorder, attention-deficit hyperactivity disorder, major depressive disorder, obsessive-compulsive disorder, eating disorder, inflammatory disorder, autoimmune disorder, metabolic disorder, cardiovascular disease and cancer. In another embodiment, the complex disorder is selected from the group consisting of diabetes, multiple sclerosis, schizophrenia, bipolar disorder, attention-deficit hyperactivity disorder, major depressive disorder, obsessive-compulsive disorder and eating disorder. In a particular exemplary embodiment, the complex disorder is schizophrenia.

The term "complex disorder" may also encompass one or more "complex traits". The terms "complex trait" and "quantitative trait" may be used interchangeably herein to refer to any phenotype that does not exhibit classic Mendelian recessive or dominant inheritance attributable to a single locus. Quantitative traits arise when the simple correspondence between genotype and phenotype breaks down, either because the same genotype can result in different phenotypes (i.e., due to the effect of chance, environment, or interaction with other genes). As a result, quantitative traits can vary among individuals, over a range, to produce a continuous distribution of phenotypes Quantitative traits would be known to persons skilled in the art, suitable examples of which include height, weight, blood pressure, cholesterol level and low-density lipoprotein (LDL) composition.

The term "trait" as used herein refers to any single feature or quantifiable measurement of an organism. A trait may be inherited, determined environmentally, or a combination of the two.

Genome-Wide Variants

The term "variant" as used herein refers to any modification to the DNA sequence as compared to one or more reference DNA sequences. Variants may involve any number of adjacent or spaced apart bases or series of bases, and may include single nucleotide substitutions, insertions, deletions, and block substitutions of nucleotides, structural variants, copy number variants, etc.

In an embodiment, variants are selected from the group consisting of common SNPs, CNV, gene deletions, gene inversions, gene duplications, splice variants and haplotypes associated with the complex disorder. In a preferred embodiment, the variants are SNPs.

The term "genome-wide variants" as used herein refers to information pertaining to genetic variants across the whole genome. Such information includes variants in both coding and non-coding regions of the genome.

In an embodiment, the data representing genome-wide variants is selected from the group consisting of single nucleotide polymorphism (SNP) genotype data, copy number variant (CNV) data, gene deletion data, gene inversion data, gene duplication data, splice variant data, haplotype data, or combinations thereof.

In an embodiment, the data representing genome-wide variants is SNP genotype data.

As used herein, the term "SNP" or "single nucleotide polymorphism" refers to a genetic variation between individuals; e.g., a single nitrogenous base position in the DNA of organisms that is variable. As used herein, "SNPs" is the plural of SNP.

The term "polymorphism" as used herein refers to a locus that is variable; that is, within a population, the nucleotide sequence at a polymorphism has more than one version or allele. One example of a polymorphism is a "single nucleotide polymorphism", which is a polymorphism at a single nucleotide position in a genome (the nucleotide at the specified position varies between individuals or populations).

The term "gene" as used herein refers to one or more sequence(s) of nucleotides in a genome that together encode one or more expressed molecules, e.g., an RNA, or polypeptide. The gene can include coding sequences that are transcribed into RNA, which may then be translated into a polypeptide sequence, and can include associated structural or regulatory sequences that aid in replication or expression of the gene.

The term "genotype" as used herein refers to the genetic constitution of an individual (or group of individuals) at one or more genetic loci. Genotype is defined by the allele(s) of one or more known loci of the individual, typically, the compilation of alleles inherited from its parents.

The term "haplotype" as used herein refers to the genotype of an individual at a plurality of genetic loci on a single DNA strand. Typically, the genetic loci described by a haplotype are physically and genetically linked, i.e., on the same chromosome strand.

The term "allele" refers to one of two or more different nucleotide sequences that occur or are encoded at a specific locus, or two or more different polypeptide sequences encoded by such a locus. For example, a first allele can occur on one chromosome, while a second allele occurs on a second homologous chromosome, e.g., as occurs for different chromosomes of a heterozygous individual, or between different homozygous or heterozygous individuals in a population. One example of a polymorphism is a SNP, which is a polymorphism at a single nucleotide position in a genome (the nucleotide at the specified position varies between individuals or populations).

The term "allele frequency" as used herein refers to the frequency (proportion or percentage) at which an allele is present at a locus within an individual, within a line, or within a population of lines. For example, for an allele "A" diploid individuals of genotype "AA", "Aa" or "aa" may have allele frequencies of 2, 1, or 0, respectively. One can estimate the allele frequency within a line or population (e.g., cases or controls) by averaging the allele frequencies of a sample of individuals from that line or population. Similarly, one can calculate the allele frequency within a population of lines by averaging the allele frequencies of lines that make up the population.

An individual is "homozygous" if the individual has only one type of allele at a given locus (e.g., a diploid individual has a copy of the same allele at a locus for each of two homologous chromosomes). An individual is "heterozygous" if more than one allele type is present at a given locus (e.g., a diploid individual with one copy each of two different alleles). The term "homogeneity" indicates that members of a group have the same genotype at one or more specific loci. In contrast, the term "heterogeneity" is used to indicate that individuals within the group differ in genotype at one or more specific loci.

The term "locus" as used herein refers to a chromosomal position or region. For example, a polymorphic locus is a position or region where a polymorphic nucleic acid, trait determinant, gene or marker is located. In a further example, a "gene locus" is a specific chromosome location (region) in the genome of a species where a specific gene can be found.

Methods for obtaining data representing genome-wide variants would be known to persons skilled in the art, illustrative examples of which include performing microarray analysis, massively parallel sequencing, amplicon sequencing, multiplexed PCR, molecular inversion probe assay, GoldenGate assay, allele-specific hybridization, DNA-polymerase-assisted genotyping, ligase-assisted genotyping, and comparative genomic hybridization (CGH). Alternatively, data representing genome-wide variants may be obtained from published datasets.

In an embodiment, the data representing genome-wide variants is obtained from genome-wide association study (GWAS) summary statistics.

It is contemplated herein that the data representing genome-wide variants from the plurality of individuals with the complex disorder and the plurality of individuals without the complex disorder may be obtained using one method, which may differ from the method for obtaining data representing genome-wide variants from the subject. For example, SNP genotype data from the plurality of individuals with the complex disorder and the plurality of individuals without the complex disorder may be obtained by SNP microarray, while the SNP genotype from the subject may be obtained by massively parallel sequencing.

In an embodiment, the data representing genome-wide variants from a plurality of individuals with the complex disorder and a plurality of individuals without the complex disorder is obtained from a GWAS. GWAS are observational studies of a genome-wide set of genetic variants in different individuals to see if any variant is associated with a trait. GWAS have identified a large number of genetic variants significantly associated with human disease. These disease-associated variants have provided candidate genes for further study and hypotheses about disease mechanisms. GWAS have also confirmed the polygenic nature of complex disorders, particularly for psychiatric disorders. For example, GWAS studies have demonstrated that the cumulative effect of a large number of weakly associated SNPs, most of which are not statistically significant alone.

Variants significantly associated with the complex disorder are filtered by statistical comparison of the data representing genome-wide variants from the plurality of individuals with the complex disorder (i.e., cases) and the plurality of individuals without the complex disorder (i.e., controls).

In accordance with the methods disclosed herein, filtering of variants is performed at a plurality of P value thresholds ($P_T$).

In an embodiment, at least one of $P_T$ identifies all variants associated with the complex disorder, i.e., the $P_T$ is permissive enough to enable the identification of all variants that occur more commonly in a case population than in the control population.

A variant is "significantly associated" with a specified phenotype (i.e., complex disorder) when it can be statistically linked (positively or negatively) to the phenotype at a given $P_T$. That is, the variant occurs more commonly in a case population (e.g., a plurality of individuals with a complex disorder) than in a control population (e.g., a plurality of individuals without the complex disorder).

Gene Set Association Analysis

The terms "gene set association analysis" or "GSAA" refer to computational methods for testing the cumulative effect of multiple variants. As described elsewhere herein, due to the polygenic nature of complex disorders, testing for association with sets of functionally related variants can provide biological context for multiple genetic risk factors. Furthermore, given the small effect sizes of most associations with common variants, examining the cumulative effect of multiple variants can improve the power to detect genetic risk factors for complex disorders. Finally, testing for associations at the pathway level may also account for the genetic heterogeneity within affected populations. Since genetic heterogeneity within a study population will lead to a mixture of small genetic effects, detecting their cumulative effect is possible using GSAA.

Gene set association comprises a test of the null hypothesis of no genes being in the set being associated with the phenotype in a self-contained construct or a null of the set genes being no more strongly associated with the phenotype than all other genes in the competitive construct. At a minimum, gene set association tests these underlying hypotheses via any statistical method that compares the set against the null. Suitable statistical methods would be known to persons skilled in the art, illustrative examples of which include test statistics (e.g., mean-based, rank-based, count-based test statistics, or combinations thereof) and mathematical transformation methods (i.e., the unit of analysis). For example, in an embodiment of the present invention, GWAS summary statistics may be processed to firstly aggregate variants into genes, followed by a multivariate test of association driven by a set of genes. These omnibus P value combination methods comprising a test statistic to sum all P values mapped to each gene, with a total P value per gene derived relative to a null distribution dependent on the properties and/or transformation of the individual P values selected for each combination. Therefore, for this embodiment, genic P values form the basis of the gene set association.

Gene set association analysis can comprise a number of steps to test the combined effect of variants at the gene level. For example, as a secondary analysis, relevant quality control and data cleaning procedures may be applied to the input data (e.g., SNP P values), thereafter, the gene set is defined based on, for example, protein coding genes. Accordingly, variants are mapped to protein coding genes based on a reference genome, that is, any current or future reference sequence e.g., human genome assembly 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1).

Persons skilled in the art would appreciate that the genic boundaries for protein coding genes may be adjusted to capture potential regulatory variation. Suitable variation in the genic boundaries may encompass between about 10 kb upstream and about 10 kb downstream, preferably between about 9 kb upstream and about 9 kb downstream, preferably between about 8 kb upstream and about 8 kb downstream, preferably between about 7 kb upstream and about 7 kb downstream, preferably between about 6 kb upstream and about 6 kb downstream, preferably between about 5 kb upstream and about 5 kb downstream, preferably between about 5 kb upstream and about 4 kb downstream, preferably between about 5 kb upstream and about 3 kb downstream, preferably between about 5 kb upstream and about 2 kb downstream, preferably between about 5 kb upstream and about 1.9 kb downstream, preferably between about 5 kb upstream and about 1.8 kb downstream, preferably between about 5 kb upstream and about 1.7 kb downstream, preferably between about 5 kb upstream and about 1.6 kb downstream, more preferably between about 5 kb upstream and about 1.5 kb downstream.

Other data processing steps such as linkage disequilibrium (LD) analysis between markers may then be estimated, followed by the calculation of gene level association to quantify the aggregated effect of all P values in a gene using, for example, the mean $\chi^2$ statistic of the P values for each gene, Fisher's method, Stouffer method and Liptak-Stouffer (LST) method.

In an embodiment, the gene set association analysis is a regression analysis. The term "regression analysis" as used herein refers to a set of statistic processes for estimating the relationships among variables. Suitable regression analyses will be known to persons skilled in the art, illustrative examples of which include linear and non-linear regression, Bayesian methods, percentage regression, least absolute deviations, non-parametric regression and distance metric learning.

Methods and tools to perform gene set association analysis would be known to persons skilled in the art, illustrative examples of which include Multi-marker Analysis of Genomic Annotation (MAGMA), GSAASeqSP and i-GSEA4GGWAS.

Functional Annotation

Annotation of sequence variants provides functional (i.e., biological) relevance to a particular variant, sets of variants or gene sets enriched for variants. In accordance with the methods disclosed herein, a plurality of annotations corresponding to a plurality of predefined annotation categories are generated for each of the gene sets identified as being significantly associated with a complex disorder.

In an embodiment, the predefined annotation categories comprise a biological pathways annotation category, a drug target annotation category and a therapeutic agent annotation category. In another embodiment, the predefined annotation categories comprise a biological pathways annotation category, a drug target annotation category, a therapeutic agent annotation category a dietary supplement category and a lifestyle intervention annotation category.

The biological pathways annotation category includes information that can link genes and variants to one another based on biological, molecular and/or functional relationships. These relationships are useful for pathway-based process association methods or inferring the phenotypic influence of particular variants. In the methods disclosed herein, gene ontology biological processes of genes with at least one variant are used to provide biological relationships. High quality canonical and hallmark gene sets provide biological relationships. Suitable canonical and hallmark gene sets would be known to persons skilled in the art, illustrative examples of which include MSigDB (https://software.broadinstitute.org/gsea/migsigdb/), Kyoto Encyclopedia of Genes and Genomes (KEGG), Reactome pathway database and BioCarta pathway collection.

The drug target annotation category determines whether biological pathways overlap with a "druggable" interaction. Suitable "druggable" interactions would be known to persons skilled in the art, illustrative examples of which include the "druggable genome" (Hopkins & Groom, 2002, *Nature Reviews Drug Discovery*, 1: 727-730) and the Target Central Resource Database (TCRD).

The therapeutic agent annotation category determines whether the variants in at least one gene that is known to interact with an approved pharmaceutical in the DrugCentral Database (also referred to as $T_{Clin}$, $N_{Pathways}$).

The dietary supplement annotation category determines whether the variants in at least one gene that is known to overlap with a druggable interaction can be modified with a dietary supplement. Suitable databases providing such dietary supplement information would be known to persons skilled in the art, illustrative examples of which include the Computer Access to Research on Dietary Supplements (CARDS) database, Dietary Supplement Label Database (DSLD) and the DrugCentral Database.

The lifestyle intervention annotation category determines whether the variants in at least one gene that is known to overlap with a druggable interaction can be modified with a lifestyle intervention. Suitable databases providing such lifestyle intervention information would be known to persons skilled in the art, illustrative examples of which include the Intervention (I) Database. In the methods disclosed herein, lifestyle intervention annotation may also be derived from ontological searching of key terms from literature databases. Suitable literature databases would be known to skilled in the art, illustrative embodiments including MEDLINE, Embase, Web of Science, The Cochrane Library, Centre for Reviews and Dissemination database, Joanna Briggs Institute database, EPPI-Centre Database of Promoting Health Effectiveness Reviews and CINAHL database.

In an embodiment, the pharmacologically relevant pathway is enriched for variants in one or more genes or gene sets with a biological pathways annotation, a drug target annotation and at least one approved therapeutic agent annotation. In another embodiment, the pharmacologically relevant pathway is enriched for variants in one or more genes or gene sets with a biological pathways annotation and a drug target annotation. The skilled person would appreciate that the number of genes in a gene set enriched for variants in a specific drug interactions annotation category will vary. In an embodiment, the identified gene set will have minimum overlap of one gene, preferably two genes, or more preferably three genes.

Methods for the Treatment or Prevention of a Complex Disorder

As used herein the terms "treat", "treating", "treatment", "prevent", "preventing", "prevention", "prophylaxis" and the like refer to any and all methods that remedy, prevent, hinder, retard, ameliorate, reduce, delay or reverse the progression of a complex disorder or one or more undesirable symptoms thereof in any way. Thus the terms "treating" and "preventing" and the like are to be considered in their broadest context. For example, treatment does not necessarily imply that a patient is treated until total recovery. Complex disorders are characterized by multiple symptoms, and thus the treatment need not necessarily remedy, prevent, hinder, retard, ameliorate, reduce, delay or reverse all of said symptoms. Methods of the present disclosure may involve "treating" a complex disorder in terms of reducing or ameliorating the occurrence of a highly undesirable event or symptom associated with the complex disorder or an outcome of the progression of the disorder, but may not of itself prevent the initial occurrence of the event, symptom or outcome. Accordingly, treatment includes amelioration of the symptoms of a complex disorder or preventing or otherwise reducing the risk of developing symptoms of a complex disorder.

As used herein, the term "agent" includes a compound that induces a desired pharmacological and/or physiological effect. The term also encompasses pharmaceutically acceptable and pharmacologically active ingredients of those compounds specifically mentioned herein including but not limited to salts, esters, amides, prodrugs, active metabolites, analogs and the like. When the above term is used, it will be understood by persons skilled in the art that this includes the active agent per se as well as pharmaceutically acceptable, pharmacologically active salts, esters, amides, prodrugs, metabolites, analogs, etc. The term "agent" is not to be construed narrowly but extends to small molecules, proteinaceous molecules such as peptides, polypeptides and proteins as well as compositions comprising them and genetic molecules such as RNA, DNA and mimetics and chemical analogs thereof as well as cellular agents. The term "agent" also includes a cell which is capable of producing and secreting the agents referred to herein, as well as a polynucleotide comprising a nucleotide sequence that encode such agents. Thus, the term "agent" extends to nucleic acid constructs including vectors such as viral or non-viral vectors, expression vectors and plasmids for expression in and secretion in a range of cells.

In accordance with the methods described herein, therapeutic agents are not limited to agents that have been approved for the specific treatment of the complex disorder. For example, the therapeutic agents described herein may be agents that have approved from the treatment of other human health conditions. Such "off-label" use of approved therapeutic agents is referred to as "repurposing", which broadens the scope of available agents that may be used to treat a subject with a complex disorder.

The term "biological sample" as used herein refers to any sample that can be from or derived a human subject, e.g., bodily fluids (blood, saliva, urine etc.), biopsy, tissue, and/or waste from the patient. Thus, tissue biopsies, stool, sputum, saliva, blood, lymph, tears, sweat, urine, vaginal secretions, or the like can easily be screened for SNPs, as can essentially any tissue of interest that contains the appropriate nucleic acids. The sample may be in a form taken directly from the patient, or may be at least partially processed (purified) to remove at least some non-nucleic acid material.

In an aspect, the present disclosure provides a method for preventing a complex disorder in a subject at risk of developing the complex disorder comprising:
a. identifying one or more pharmacologically relevant biological pathways comprising the steps of:
  i. obtaining data representing genome-wide variants from a plurality of individuals with the complex disorder and a plurality of individuals without the complex disorder;
  ii. selecting a plurality of groups of variants significantly associated with the complex disorder, wherein each group of variants is identified using a plurality of P value thresholds ($P_T$);
  iii. performing gene set association analysis on each of the plurality of groups of variants to identify gene sets enriched for variants significantly associated with the complex disorder;
  iv. for each of the identified gene sets, generating a plurality of annotations corresponding to a plurality of predefined annotation categories, wherein the plurality of predefined annotation categories comprise a biological pathways annotation category, a drug target annotation category, a therapeutic agent annotation category, a dietary supplement annotation category and a lifestyle intervention annotation category; and
  v. identifying one or more pharmacologically relevant biological pathways, wherein the pharmacologically relevant biological pathways comprise an annotated biological pathway and an annotated drug target;
b. selecting a treatment to prevent the development of the complex disorder comprising the steps of:
  i. obtaining data representing genome-wide variants in a biological sample from the subject;
  ii. calculating a predictive polygenic score for the pharmacologically-relevant biological pathways identified in step (a)(v) from the subject's genome wide variants data using each of the plurality of $P_T$ in step (a)(ii); and
  iii. identifying a subject as being at risk of developing the complex disorder, wherein a predictive polygenic score that is elevated relative to a reference value indicates that the subject may be at risk of developing the complex disorder, wherein the pharmacologically relevant biological pathways with a predictive polygenic score that is elevated relative to a reference value have at least one additional annotation selected from the group a therapeutic agent annotation, a dietary supplement annotation and a lifestyle intervention annotation, and
c. treating the subject with one or more of the annotated therapeutic agent, dietary supplement or lifestyle intervention to prevent the development of the complex disorder.

The therapeutic regimen for the prevention of a complex disorder will typically depend on factors including, but not limited to, the type of complex disorder and the age, weight, and general health of the subject. Another determinative factor will be the level of risk of developing the complex disorder in accordance with the predictive polygenic score for the pharmacologically relevant biological pathways calculated by the methods disclosed herein. For instance, for a subject identified as being high risk of developing a complex disorder, a more aggressive therapeutic regimen may be prescribed as compared to a subject deemed at low or lower risk of developing a complex disorder.

Pharmagenic Enrichment Score

The term "pharmagenic enrichment score" or "PES" as used herein refers to a predictive polygenic score calculated for a pharmacologically-relevant biological pathways based on the presence or absence of variants in the genome-wide variant information obtained from a biological sample taken from a subject with a complex disorder.

The PES described herein provides a quantitative measure of an individuals' exposure to variants that are potentially treatable by existing pharmaceutical agents, including those that have not been considered or tested previously for the particular complex disorder that the subject is experiencing. By focusing on biological pathways with known drug targets, the methods as disclosed herein enhances the clinical utility of polygenic risk approaches or "polygenic risk scores" by providing opportunities to identify therapeutic targets and/or repurposing known therapeutic agents.

The term "polygenic risk score" is used to define an individuals' risk of developing a complex disorder or progressing to a more advanced stage of a disorder, based on a large number, typically thousands, of common genetic variants each of which might have modest individual effect sizes contribute to the disease or its progression, but in aggregate have significant predicting value. In the present case, polygenic risk score may be used to predict the likelihood that a patient will develop a complex disorder using common single nucleotide SNPs associated with the complex disorder. However, genome-wide polygenic risk score (as a biologically unannotated instrument) does not necessarily provide insight into pathways suitable for pharmacologically intervention in individuals.

In accordance with the methods disclosed herein, an elevated PES for a given pharmacologically relevant pathway is indicative that the subject will be sensitive to a therapeutic agent that is known to interact with the pharmaceutically relevant pathway. As described elsewhere herein, elevated PES is not significantly related to polygenic risk. Accordingly, the PES approach can capture latent enrichment of polygenic signal in pathways relevant to pharmaceutical actions in subjects with a low overall trait PRS relative to others with the same complex disorder phenotype.

In an embodiment, PES is calculated from SNPs mapped to genes which form the candidate pharmacologically actionable geneset. This may comprises a model (1) which sums the statistical effect size of each variant in the geneset multiplied by the allele count (dosage) for said variant. For example, for individual i, let $\hat{\beta}_j$ denote the statistical effect size from the GWAS for each variant j in the geneset, multiplied by the dosage (G) of j in i.

$$PES_i = \Sigma \hat{\beta}_j \times G_{ij}) \quad (1)$$

Reference Predictive Polygenic Score

The methods disclosed herein comprise a comparison step (i.e., to identify whether the subject will respond to an agent) in which the predictive polygenic score for each of the pharmacologically-relevant biological pathways based on the presence or absence of variants determined from the genome-wide variant information obtained from a biological sample from the subject is compared to a reference predictive polygenic score; that is, a known or predetermined predictive polygenic score for each of the pharmacologically-relevant biological pathways that is associated with sensitivity to a therapeutic agent, as described elsewhere herein.

The term "reference predictive polygenic score" is interchangeable with the terms "reference pharmagenic enrichment score" or "reference PES". In an illustrative example, the comparison may be carried out using a reference predictive polygenic score that is representative of a known or predetermined predictive polygenic risk score from an individual, from a large reference cohort or a cohort of case and controls for the complex disorder phenotype in question, that is associated with sensitivity to a therapeutic agent, as described elsewhere herein.

The reference predictive polygenic score is typically a predetermined predictive polygenic score in a particular cohort or population of subjects (e.g., normal healthy controls, subjects with the complex disorder phenotype in question, subjects who had no sign of the complex disorder at the time the reference sample was obtained but who have gone on to develop the complex disorder, etc.). The reference value may be represented as an absolute number, or as a mean value (e.g., mean+/−standard deviation), such as when the reference value is derived from (i.e., representative of) a population of individuals.

Whilst persons skilled in the art would understand that using a reference predictive polygenic score that is derived from a sample population of individuals is likely to provide a more accurate representation of the predictive polygenic score in that particular population (e.g., for the purposes of the methods disclosed herein), in some embodiments, the reference predictive polygenic score can be a predictive polygenic score derived from the genome-wide variant information obtained from a single biological sample.

Computer Systems

The present disclosure also contemplates computational processes or systems that enable the formatting, analysis, annotation and processing in accordance with the methods disclosed herein. Accordingly, in an aspect, there is provided a computer-based genomic annotation system, comprising non-transitory memory configured to store instructions and at least one processor coupled with the memory, the processor configured to:

a. receive genome-wide variant data from a plurality of individuals with a complex disorder and a plurality of individuals without a complex disorder;
b. processing the genome-wide variant data to select a plurality of groups of variants significantly associated with the complex disorder, wherein each group of variants is identified using a plurality of P value thresholds ($P_T$);
c. performing gene set association analysis on each of the plurality of groups of variants to identify gene sets enriched for variants significantly associated with the complex disorder;
d. for each of the identified gene sets, generating a plurality of annotations corresponding to a plurality of predefined annotation categories, wherein the plurality of predefined annotation categories comprise a biological pathways annotation category, a drug target annotation category and an approved therapeutic agent annotation category; and
e. identifying one or more pharmacologically relevant biological pathways, wherein the pharmacologically relevant biological pathways comprise an annotated biological pathway, an annotated drug target and at least one annotated approved therapeutic agent.

In an embodiment, the computer-based genomic annotation system further comprising a separate computational process to interrogate the genotype of an individual subject to select an agent suitable for the treatment of a complex disorder comprising:

a. receiving genome-wide variant data from a biological sample from the subject;
b. calculating a predictive polygenic score for the pharmacologically-relevant biological pathways from the subject's genome wide variants data using each of the plurality of $P_T$; and
c. selecting at least one therapeutic agent from the treatment of the complex disorder, wherein a predictive polygenic score calculated for each $P_T$ that is elevated relative to a reference value indicates that the subject may be sensitive to the at least one annotated therapeutic agent.

The computational processes underlying the system output proceeds in a parallel fashion and include classes of variant annotations that are entirely independent of one another, serially dependent annotations whose execution are dependent upon the completion and status of prior annotations and annotations that generate new information through the combination or multiple annotation categories. In a preferred embodiment, the computational processes underlying the system output proceeds in a parallel fashion and includes classes of serially dependent annotations, whereby the execution of the drug target annotation category is dependent upon the completion of the biological pathways annotation category, and so on.

Suitable data inputs for processing in accordance with the methods disclosed herein would be known to persons skilled in the art, illustrative embodiments of which include GWAS summary statistics, gene definition files, LD reference, definitions of genesets and genotype data (e.g., PLINK binary, PLINK text, VCF, BCF, Oxford format, 23andMe text, VDS, gVCF, KGGseq binary filesets, including versions and corresponding format parameters thereof).

All publications mentioned in this specification are herein incorporated by reference. The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

It will be appreciated by persons skilled in the art that numerous variations and/or modifications may be made to the present disclosure without departing from the spirit or scope of the disclosure as broadly described. The present embodiments are, therefore, to be considered in all respects as illustrative and not restrictive.

The present disclosure will now be further described in greater detail by reference to the following specific examples, which should not be construed as in any way limiting the scope of the disclosure.

EXAMPLES

Materials and Methods

Curation of Pharmacologically Relevant Gene Sets

High quality canonical and hallmark gene sets were sourced from the molecular signatures database MSigDB (https://software.broadinstitute.org/gsea/msigdb/). Canonical pathways originate from the Kyoto Encyclopedia of Genes and Genomes (KEGG), Reactome pathway database and BioCarta pathway collection. Hallmark gene sets were curated by the MSigDB. To select pathways with potential drug targets we utilized gene definitions from the Target Central Resource Database (TCRD). Pathways overlapping with one or more highest-confidence druggable genes, that is, a gene with a known target interaction with an approved agent ($T_{Clin}$), were included in the study. Drugs were mapped to gene sets using DGidb v3.02, with the top FDA approved drug per pathway was selected based on the DGidb score of interaction confidence between a $T_{Clin}$ gene and drug. Clinical trials in schizophrenia registered for each drug were searched in ClinicalTrials.gov (https://www.clinicaltrials.gov/). ATC codes annotated each drug and were derived from the ATC 2018 index provided by WHO collaborating center for drug statistics methodology (https://www.whocc.no/atc_ddd_index/).

Gene Set Association Analysis

The full summary statistics from GWAS for bipolar disorder, attention-deficit hyperactivity disorder, major depressive disorder, obsessive compulsive disorder, eating disorder and the 2014 psychiatric genomics consortium (PGC) schizophrenia mega GWAS (Schizophrenia Working Group of the Psychiatric Genomics et al., 2014, *Nature*, 511: 421-427) were downloaded and processed. Variants were selected based on their significance (P value) for inclusion in the at four different thresholds—all SNPs ($N_{SNPs}$=9444230), P<0.5 ($N_{SNPs}$=5423694), P<0.05 ($N_{SNPs}$=1085118), and P<0.005 ($N_{SNPs}$=302313). Gene set association was undertaken using MAGMA (Multi-marker Analysis of Genomic Annotation) for each of the thresholds (de Leeuw et al., 2015, *PLoS Computational Biology*, 11: e 1004219). Firstly, SNPs were mapped to protein coding genes (hg19, NCBI) with the genic boundaries adjusted to encompass 5 kb upstream and 1.5 kb downstream to capture potential regulatory variation. Linkage disequilibrium (LD) between markers was estimated by MAGMA using the 1000 Genomes Phase 3 European reference panel. Genes within the extended major histocompatibility complex (MHC) region were excluded from this study due to the complexity of haplotypes in that region.

The parameters of the MAGMA model briefly include, gene-level association was calculated using the mean $\chi^2$ statistic of the P values for each gene. After probit transformation of P values to Z values, competitive gene-set association was undertaken using the druggable gene sets as input. A significance threshold of P<0.001 was set for inclusion of pathways for further analysis. Using WebGestalt (Wang et al., 2017, *Nucleic Acids Research*, 45: W130-W137), enriched drugs for each gene set was calculated (DrugBank targets) with overrepresentation analysis (Fisher's Exact Test), with a minimum overlap of three genes and P values adjusted for multiple testing correction using the Benjamini-Hochberg false discovery rate (FDR) approach. Drugs with "investigational" ATC annotation were not considered in downstream analyses of the candidates. Further, the tissue specificity of expression for all genes from the eight pathways was investigated using GENE2FUNC application of FUMA (Watanabe et al., 2017, *Nature Communications*, 8: 1826). Transcript expression in each of the 53 tissue types in the GTEx v7 dataset for the input pathway genes were tested for upregulation, downregulation and two-sided differential expression in comparison to the entire protein-coding genome. Enrichment of input genes for associated traits in GWAS catalogues was also tested in this framework.

Description of Study Cohort

Individuals genotyped in this study were sourced from the Australian Schizophrenia Research Bank (ASRB), a public databank of clinical and cognitive measures, neuroimaging and DNA for a large cohort of schizophrenia cases and screened controls with no immediate family history of psychotic illness from several Australian research sites (Loughlan et al., 2010, *Australian and New Zealand Journal of Psychiatry*, 44: 1029-1035). After the removal of individuals in the post-genotyping quality control, 425 schizophrenia cases and 251 controls were analyzed in this study, cases were 67% male, whilst males comprised 44% of the control cohort.

Genotyping and Quality Control

The Illumina Infinitium Human 610K (610-Quad) BeadChip platform was used to genotype genomic DNA extracted from peripheral blood mononucleocytes as per standard manufacturer protocols. Autosomal sites were only processed for imputation, with the following pre-imputation quality control (QC) filters implemented with PLINK 1.9 (Purcell et al., 2007, *American Journal of Human Genetics*, 81: 559-575): Minor allele frequency <0.01, call rate <98% and Hardy-Weinberg Equilibrium $P<10^{-6}$. Ambiguous SNPs not assigned to a strand were also filtered out. One individual of a pair with an inbreeding coefficient (IF)>0.2 and subjects with discordant sex information were removed. Relatedness testing was undertaken on high quality autosomal SNPs (MAF>0.05) in relative linkage equilibrium ($R^2<0.1$), with regions of long range LD deleted. Genome-wide identity by state removed individuals with high relatedness (N=9, pi_hat>0.185). Analyses were restricted to European subjects in the cohort. Population outliers (N=63) were excluded via principal components analysis (PCA) undertaken in PLINK 1.9, with outliers removed with k-means clustering, wherein the five generated clusters represented the 1000 genomes phase 3 reference panel super-populations. Imputation was undertaken on the autosomal sites from individuals who passed QC. Haplotypes were phased by Eagle 2.3.2 with ten mega base chunks and 500 kilobases overlap (Loh et al., 2016, *Nature Genetics*, 48: 1443-1448), followed by imputation with Minimac3 using default parameters and the 1000 genomes phase 3 European reference panel (Fuchsberger et al., 2015, *Bioinformatics*, 31: 1466-1468). High quality sites with low missigness (<2%) and an INFO imputation score greater than 0.8 ($R^2>0.8$) were retained ($N_{SNPs}=7199582$).

Individual Profiling of Pharmagenic Enrichment Score (PES)

PES was calculated for each of the significant gene sets from the GWAS analyses using PRSice2 (Euesden et al., 2015, *Bioinformatics*, 31: 1466-1468). The -- fastscore flag calculated a predictive polygenic score (i.e., PES) at the five P thresholds utilized in this study. After removal of the extended MHC region from the genotype files, variants were clumped using standard PRSice2 parameters before scoring. For each of the PES the P threshold which corresponds to the one with which the gene set was identified from the GWAS was the score recorded for each member of the cohort. The threshold that explained the most variance between cases and controls for genome wide PRS ($PRS_{Total}$) was selected using Nagelkerke's $R^2$. Association for each of the scores with cases at the selected threshold was conducted using binomial logistic regression, adjusted for sex and the first three principal components. P values were derived using the Wald test with and without the total PRS score at the optimum threshold as a covariate in the model.

Each PES was ranked in the entire ASRB cohort, with three measures of an elevated PES implemented: the top percentile, decile and quartile of the population. The number of pathways which pass these thresholds were totaled for each individual and the association between these totals and schizophrenia assessed using the same model as for univariate PRS as described above.

Gaussian Mixture Modelling-Based Clustering of PRS

Latent clusters of $PRS_{Total}$ and the total number of PES in the top decile of the ASRB were investigated in the schizophrenia cohort using probabilistic finite Gaussian mixture modelling (GMM) with the mclust package version 5.4 (Scrucca et al., 2016, *The R Journal*, 8: 289-317). Briefly, each cluster's shape, volume and orientation determined by the variance-covariance matrix (Table 1). The number of parameters and their geometric characteristics was selected using the highest value of the Bayesian information criterion (BIC).

TABLE 1

Geometric characteristics of the Gaussian models used for parameterizations of the within-group covariance matrix

| Model abbreviation* | Distribution | Volume | Shape | Orientation |
|---|---|---|---|---|
| EII | Spherical | Equal | Equal | — |
| VII | Spherical | Variable | Equal | — |
| EEI | Diagonal | Equal | Equal | Coordinate axes |
| VEI | Diagonal | Variable | Equal | Coordinate axes |
| EVI | Diagonal | Equal | Variable | Coordinate axes |
| VVI | Diagonal | Variable | Variable | Coordinate axes |
| EEE | Ellipsoidal | Equal | Equal | Equal |
| EVE | Ellipsoidal | Equal | Variable | Equal |
| VEE | Ellipsoidal | Variable | Equal | Equal |
| VVE | Ellipsoidal | Variable | Variable | Equal |
| EEV | Ellipsoidal | Equal | Equal | Variable |
| VEV | Ellipsoidal | Variable | Equal | Variable |
| EVV | Ellipsoidal | Equal | Variable | Variable |
| VVV | Ellipsoidal | Variable | Variable | Variable |

*Gaussian models described are implemented in the mclust package.

Statistical Analyses

Gene set association utilized MAGMA, the PES score calculation undertaken with PRSice-2, drug overrepresentation tests utilized the WebGestalt web application, and tissue specific expression analyses were performed by FUMA. All other statistical analyses were performed in R version 3.4.4. Binomial logistic regression models adjusted for sex and the first three principal components was constructed using the glm function to test enrichment of each derived PES in the ASRB schizophrenia cases compared to controls, with and without covariation for genome wide PRS. A multiple testing threshold for significance of $P<5.5\times10^{-3}$ was set to account for the nine tests via the Bonferroni method. Other dichotomous association tests (i.e., enrichment of PRS in carriers of a top percentile PES, association between number of top quartile/decile PES and affection status) were conducted in separate models using the same parameters. GMM was undertaken using the mclust package. We tested whether schizophrenia cases in each of the four GMM derived clusters were overrepresented for carriers of a top percentile $PRS_{Pathway}$ using multinomial logistic regression with the nnet package (https://cran.r-project.org/web/packages/nnet/index.html). The largest cluster, Cluster 2, was used as the reference for the other clusters, with the model covaried for sex and principal components as above. After dividing the regression coefficients by their standard error to derive z, P values were calculated using the Wald Test.

Example 1

Clinical Actionable Pathways Significant in Meta-Analysis of Common Variant Risk for Neuropsychiatric Disorders Using MAGMA, summary statistics from GWAS for schizophrenia, bipolar disorder, attention-deficit hyperactivity disorder, major depressive disorder, obsessive-compulsive disorder and eating disorder were processed for gene set association meta-analysis. Considering the three models with different P value thresholds ($P_T$) input (P<1, P<0.5, and P<0.05) and an FDR threshold of 0.05 there were 16 distinct gene sets with a known drug target which were significant (Table 2). Meta-analysis of SNPs with P<0.5 in their respective GWAS yielded the highest number of significant pathways with seven, followed by P<0.05 with six and P<1 with three. Two gene sets Regulation of Insulin Secretion and Integration of Energy Metabolism were associated at the P<1 threshold but with less magnitude than when utilizing the P<0.5 cut-off. Several neurologically relevant signaling pathways were represented including Wnt, retinoid, GABAergic, and nerve growth factor (NGF) signaling.

TABLE 2

Significant pathways with known drug targets after multiple testing correction for the cross-neuropsychiatric disorder meta-analysis

| Pathway | P threshold ($P_T$)* | $P_{Adjusted}$# |
|---|---|---|
| Regulation of insulin secretion | P < 0.5 | 2.75 × 10⁻³ |
| Integration of energy metabolism | P < 0.5 | 6.07 × 10⁻³ |
| Neuronal system | P < 0.5 | 6.07 × 10⁻³ |
| MAPK signaling pathway | P < 1 | 6.07 × 10⁻³ |
| Wnt pathway | P < 0.05 | 0.0181 |
| RXR:VDR pathway | P < 0.05 | 0.0181 |
| Transmission across chemical synapses | P < 0.5 | 0.0191 |
| GABA pathway | P < 1 | 0.0191 |
| Signaling by NGF | P < 1 | 0.0191 |
| Apoptotic execution phase | P < 0.05 | 0.0241 |
| EGFR SMRTE pathway | P < 0.05 | 0.0292 |
| Potassium channels | P < 0.5 | 0.0292 |
| Signaling by Wnt | P < 0.05 | 0.03 |
| Apical junction | P < 0.05 | 0.0341 |
| Dilated cardiomyopathy | P < 0.5 | 0.0341 |

FDR adjusted P values.
*P threshold refers to the inclusion of P values in the meta-analysis, i.e., P < 0.05 indicates that the only SNPs with a P value less than that threshold for at least one of the GWAS were retained.

Figure 2A:
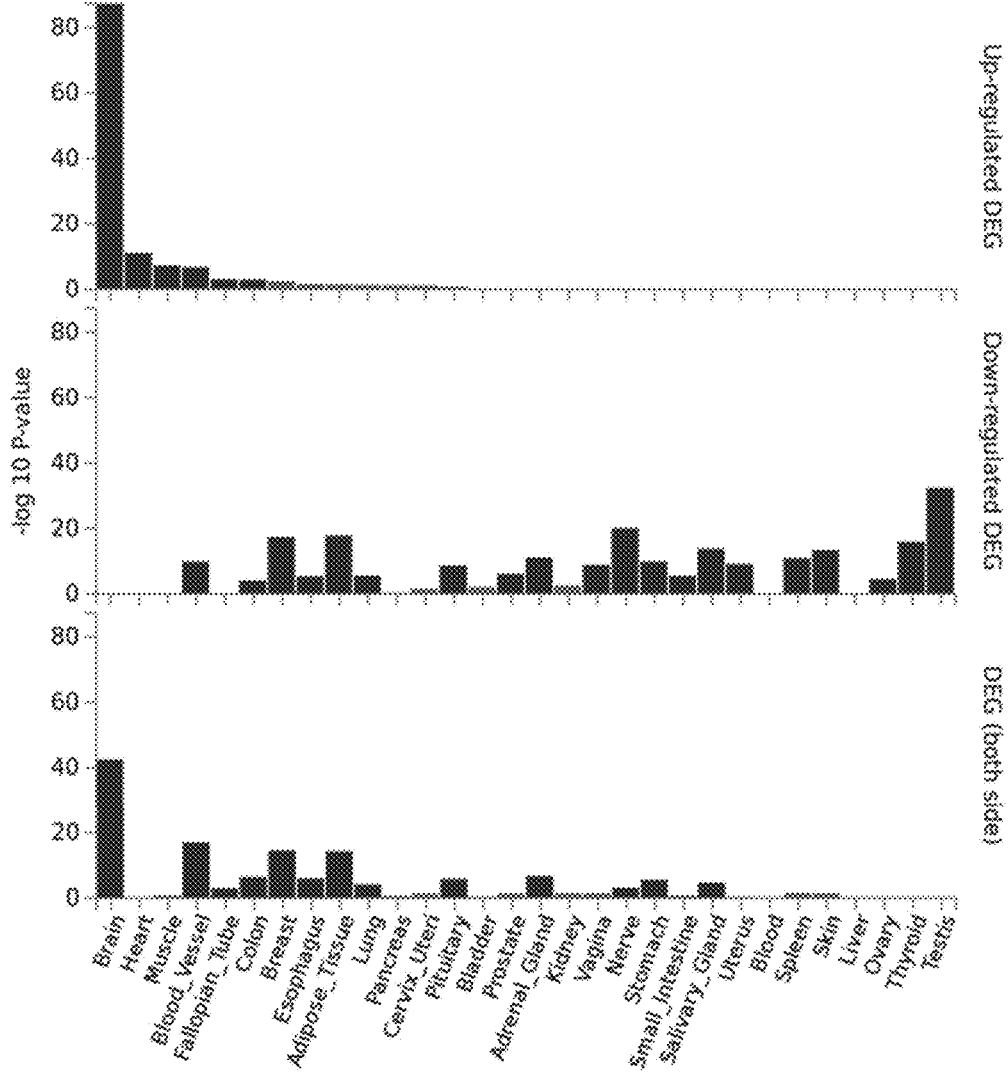
FIGS. 2A and 2B show the tissue and temporal specificity of expression for genes in cross-disorder significantly associated actionable pathways. Expression of candidate genes in (A) 30 distinct tissue types and (B) 29 different ages in the brain (pcw=post conception week, yrs=years old). Upregulation, downregulation and two-sided test of differential expression is shown for these genes, with dark grey bars indicative of statistical significance ($P_{Adjusted}<0.05$) after the application of multiple testing correction.
Figure 2B:
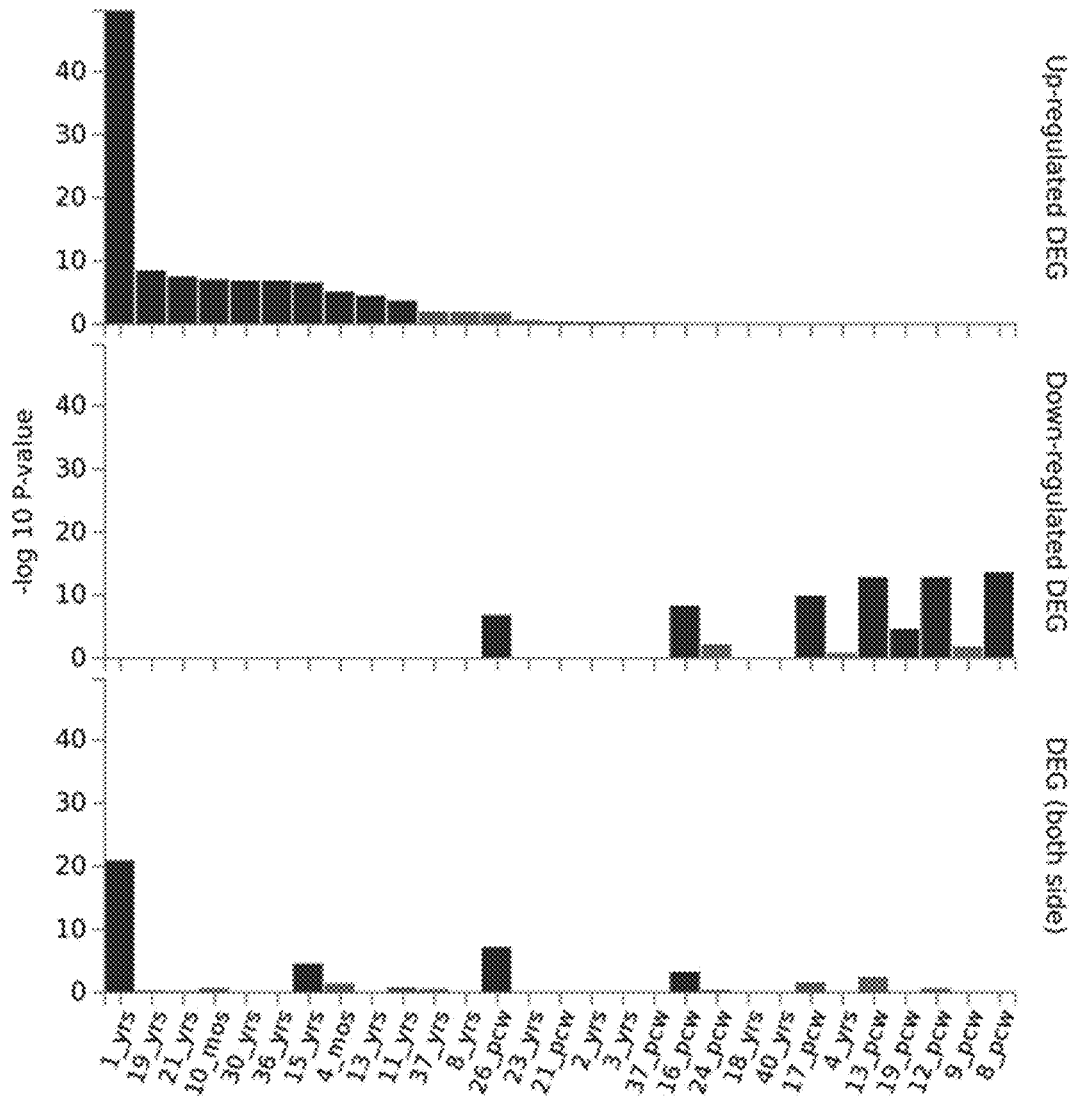

Genes which comprised significant pathways (N=1072) were investigated for the specificity of their expression in both (i) discrete tissues and (ii) developmental time points in the brain (FIG. 2). The pathway members were highly upregulated in the brain relative to the rest of the protein coding genome ($P_{Adjusted}$=1.413×10⁻⁸⁶), with the anterior cingulate cortex the most enriched region. Interestingly, there was significant downregulation in several peripheral tissues including the stomach, small intestine and adipose ($P_{Adjusted}$<0.05). Temporal expression of these transcripts in the brain at various periods revealed an enrichment at ten different ages ranging from four months to 36 years old, with a peak at one year along with significant neural downregulation at sever in utero time points (FIG. 2).

After the application of multiple testing correction, there were 173 drugs for which targets are significantly overrepresented in the one or more of the candidate pathways ($P_{Adjusted}$<0.05). The majority of the gene sets had at least one significant overrepresentation below this threshold (N=12). The most common drug classification via the Anatomical Therapeutic Chemical Classification System (ATC) was Nervous System (ATC Code Level 1: N, N=95), followed by Cardiovascular System (ATC=C, N=61), and Alimentary Tract and Metabolism (ATC=A, N=49). Within the Nervous System classification, using level two codes, most of these drugs were psycholeptics (ATC=N05, N=46), with classifications for the other six NO level codes present except anti-Parkinson's drugs (ATC=N04). At the next ATC code level, hypnotics and sedatives (ATC=N05, N=25) predominated, whilst at the most detailed ATC code (Level 4), Benzodiazepine derivative was the most common classification (ATC—N05BA, N=14).

Example 2

Pipeline for Identification of Druggable Pathways from GWAS Summary Statistics

Figure 3:
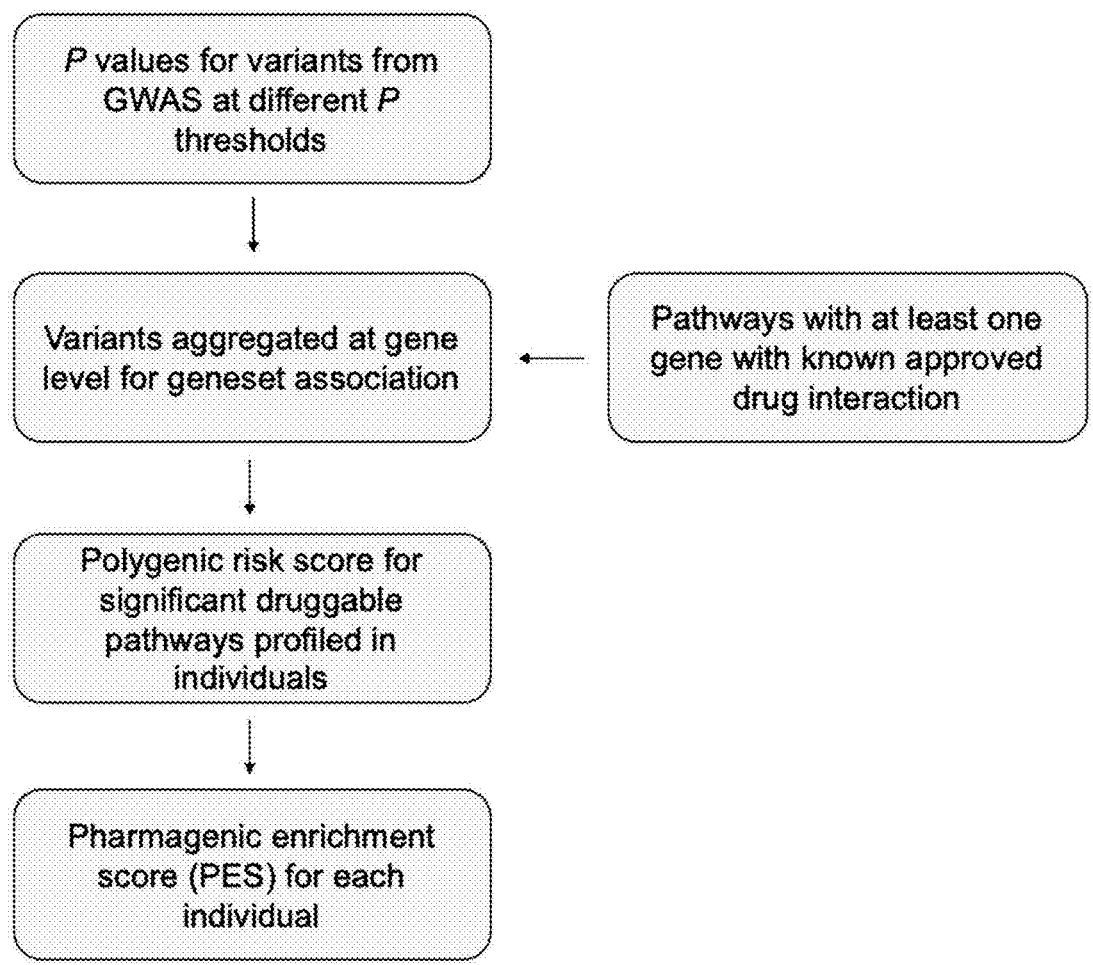
FIG. 3 is a schematic representation of the methodology for identifying pharmacologically relevant pathways enriched with GWAS risk variants.

The methodology developed for this study for constructing pharmagenic enrichment scores (PES) is outlined in the schematic presented in FIG. 3. The use of gene-set association analysis to aggregate variants from GWAS was exploited to identify gene sets that may be candidates for pharmacological intervention. In the first step, the combined effect of variants at the gene level is tested using the MAGMA approach. Briefly, when using summary statistics as input, MAGMA combines the P values for variants mapped to each gene and derives the association in comparison to a known sampling distribution. Traditionally, the full breadth of variants available in the summary statistics are utilized in these models. This, however, may miss important aspects of the biological interpretation of the genomic signal. PRS derived from large GWAS cohorts are tested at different P value thresholds ($P_T$) to exploit a model which explains the most variance between the case and control groups (in a dichotomous construct). A range of $P_T$ have been suggested to fit best for PRS analyses in several disorders. As a result, aggregating the combined effects of variants in genes at different $P_T$ may capture the biological complexity of the genomic signal at varying degrees of polygenicity.

MAGMA conducts competitive association of specified gene sets by regression of genic Z values, a probit transformation of their P value. Pathways enriched in the GWAS signal at descending $P_T$ are therefore calculated. In this study, we sought to focus on pathways that are likely to interact with a known therapeutic agent. Utilizing high quality canonical and hallmark gene sets derived from the Molecular Signatures Database (MSigDB; Liberzon et al., 2015, Cell Systems, 1: 417-425), pathways were filtered based on gene classifications from the Target Central Resource Database (TCRD), featuring data from the NIH Illuminating the Druggable Genome initiative (Oprea et al., 2018, Nature Reviews Drug Discovery, 17: 317-332). Specifically, pathways were ascribed clinical relevance if they contained at least one gene annotated to interact with an approved pharmaceutical in the DrugCentral database (termed $T_{Clin}$, $N_{Pathways}$=1012).

Once enriched pathways with a known drug target are uncovered, PRS from variants within these gene sets can be calculated at an individual level, which we term a pharmagenic enrichment score (PES). Subjects with elevated PES in a clinically actionable pathway may be candidates for intervention with a drug that is known to modulate it. A key advantage of this methodology is its capacity to detect unbiased pathway level association, which may reveal novel drug repurposing opportunities Example 3

Clinically Actionable Pathways Enriched with Common Variant Risk in Schizophrenia In schizophrenia, a psychiatric syndrome with approximately 0.7% population prevalence, heritability is traditionally estimated in the region of 80%. Global collaboration via the PGC has amassed large cohorts of schizophrenia cases to define genomic variants associated with the disorder through GWAS. Over 100 loci thus far have been identified at rigorous genome-wide significance levels, with common variants encompassed by GWAS shown to account for a significant portion of schizophrenia heritability. However, its application to treatment is not well defined, particularly as it provides no insight into novel clinical interventions beyond the traditional antipsychotic paradigm.

Figure 4A:
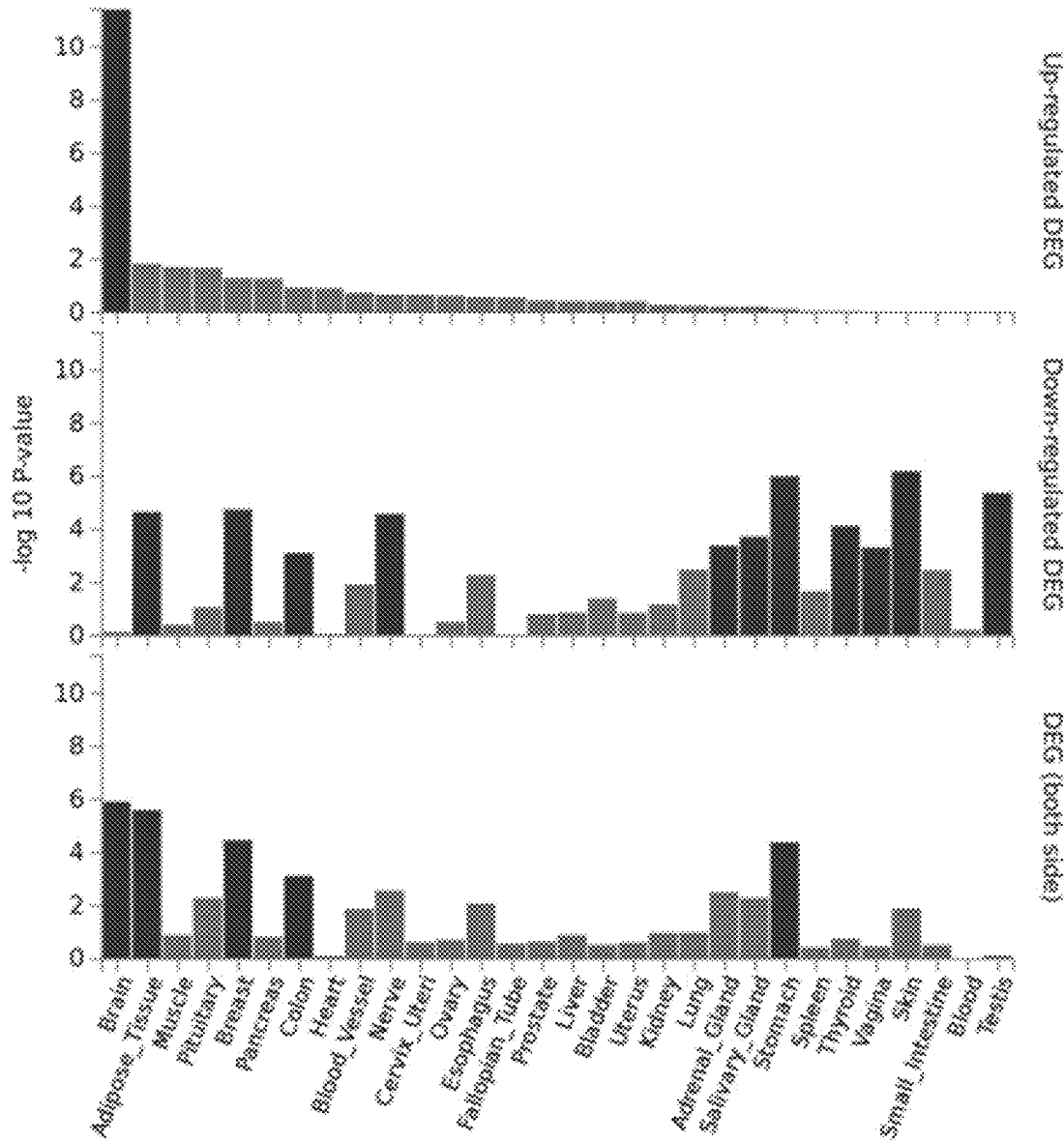
FIGS. 4A and 4B are graphical representations of tissue specific expression of genes containing within candidate PES pathways derived from schizophrenia GWAS.
Figure 4B:
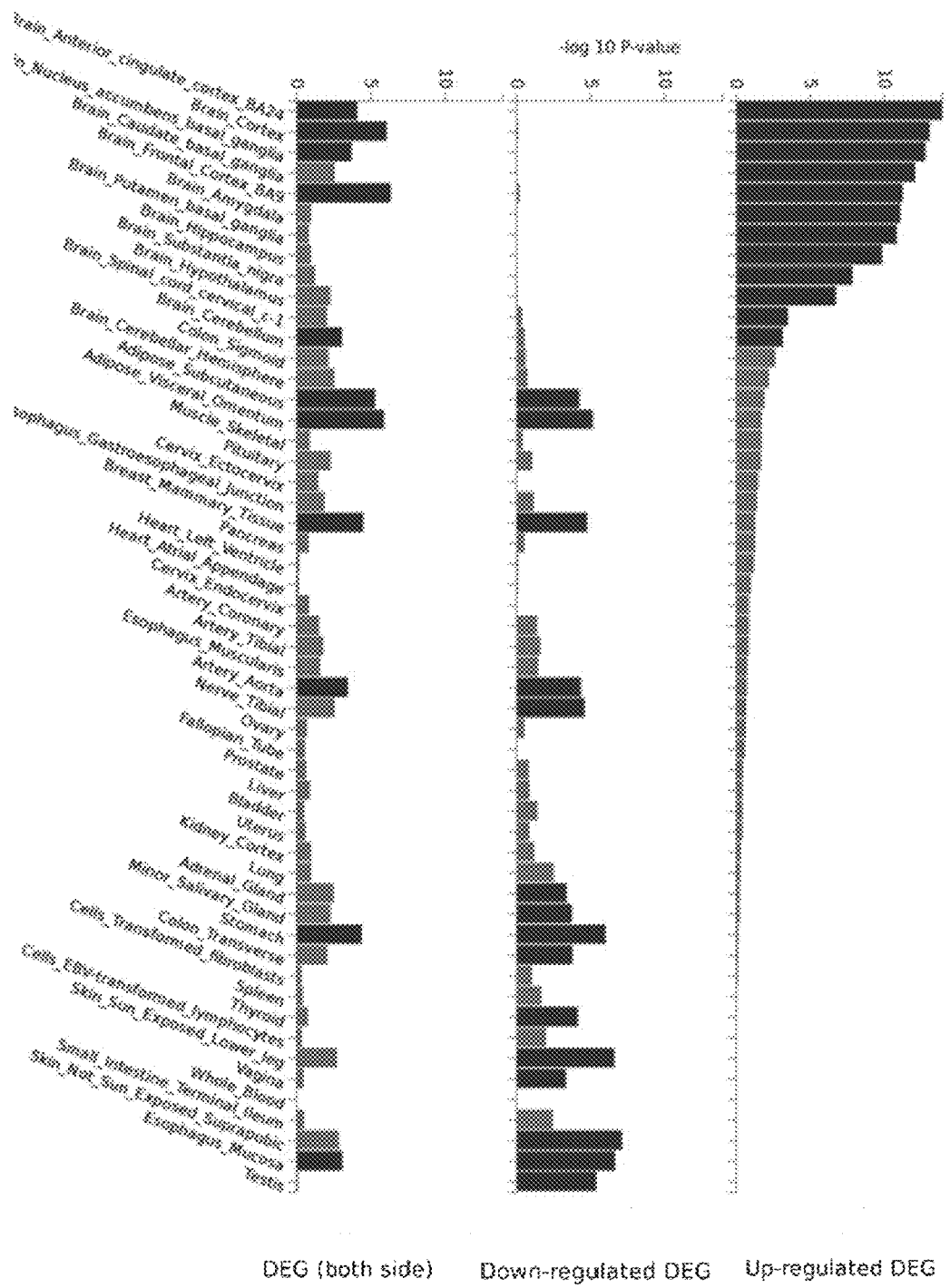
Figure 6A:
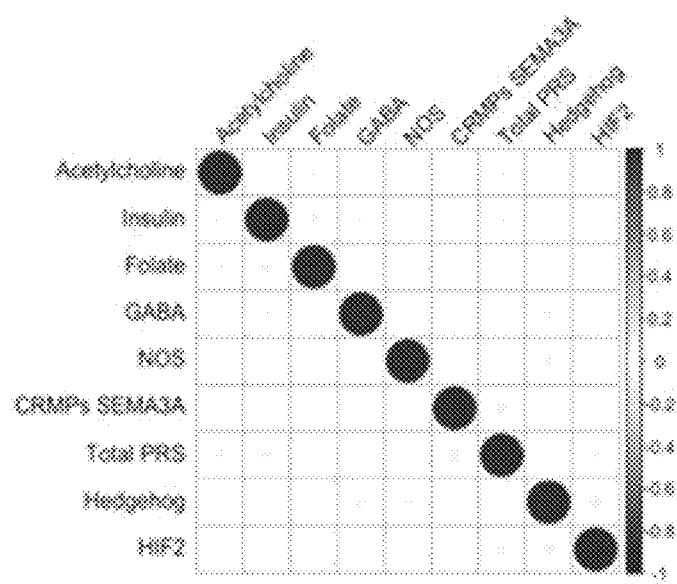
FIGS. 6A, 6B, 6C, and 6D show the relationship between genome wide schizophrenia PRS and pharmagenic enrichment scores in the ASRB cohort. (A) A graphical representation of a pairwise univariate correlation between each of the PES and total PRS. Scale represents strength of relationship in the positive or negative direction. (B) A graphical representation of kernel density (y-axis) against estimation of distribution of total PRS (x-axis) amongst individuals with multiple PES in the top decile or (C) quartile. Scale refers to the number of PES over the threshold in an individual, that is, a score of six represents an individual with six PES in the top quartile or decile of the ASRB cohort. (D) A graphical representation of kernel density (y-axis) against the distribution of total PRS (x-axis) between ASRB participants with at least one PES in the top percentile of the cohort (grey) or without (dark grey). Black dashed line represents the mean $PRS_{Total}$ for the cohort with a top percentile PES (right) and without (left).
Figure 6B:
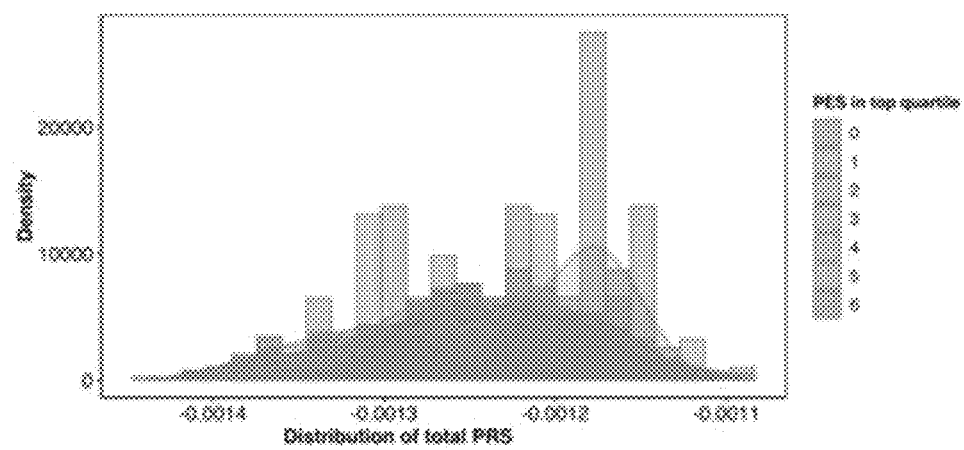
Figure 6C:
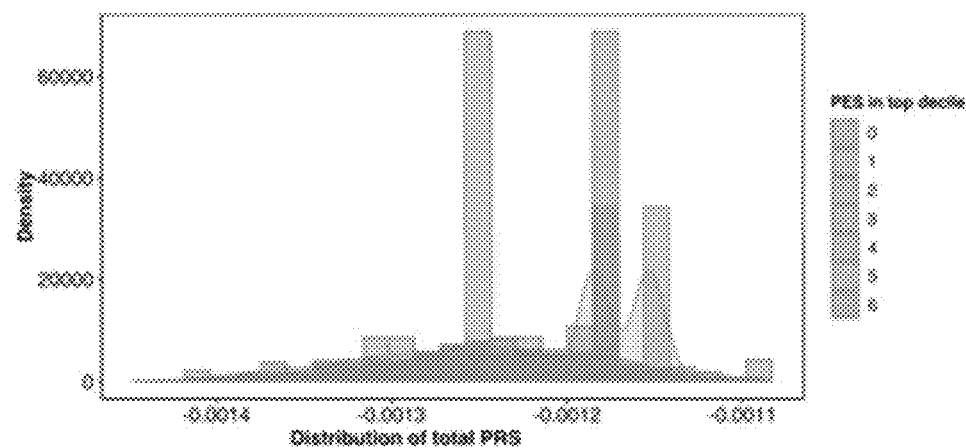
Figure 6D:
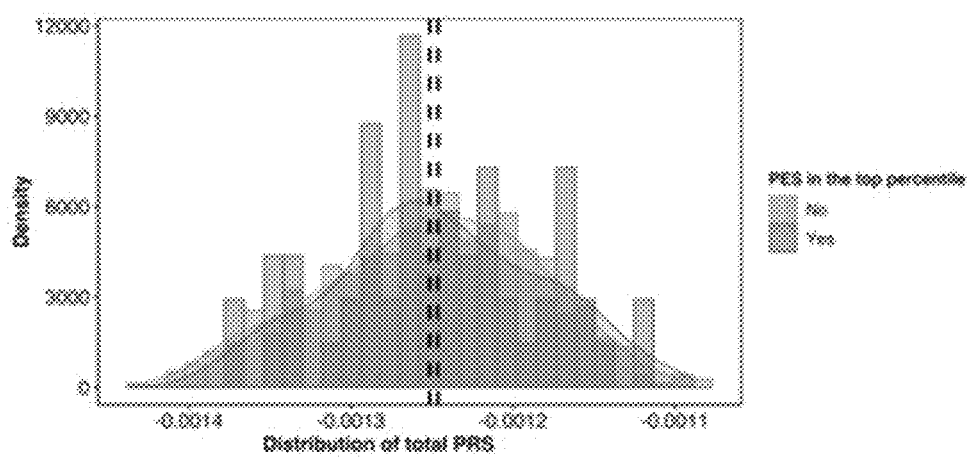

To address this, we profiled PES in a cohort of schizophrenia patients (N=425) and screened healthy controls (N=251) from samples collected by the ASRB. To identify clinically actionable gene-sets and construct PES, we processed the 2014 PGC schizophrenia mega GWAS. Using MAGMA, gene-set association was undertaken on filtered pathways at four $P_T$ ($P_T<1$, $P_T<0.5$, $P_T<0.05$, $P_T<0.005$). The extended major histocompatibility complex (MHC) region on chromosome six was removed from the analysis due to its haplotype complexity, which could confound the model. To capture a wide variety of pathways for a complex phenotype like schizophrenia, we used a nominal significance threshold of P<0.001 for pathway inclusion. Eight gene-sets were selected from the schizophrenia GWAS at the different $P_T$ with known drug targets (Table 3). The most significantly associated gene-set was the HIF-2 pathway (P=3.12×10$^{-5}$, β=0.435, SE=0.109, $P_T<0.005$), which is comprised of genes in the hypoxia inducible factor 2 (HIF-2) alpha transcription factor network. One carbon pool by folate was the second most significant pathway with a putative drug interaction (P=1.4×10$^{-4}$, β=0.433, $P_T<0.05$). Two gene-sets were related to the function of the neurotransmitters GABA and Acetylcholine, whilst other signaling pathways represented were NOS1 (Nitric Oxide Synthase I), Hedgehog signaling and the semaphorin related CRMP (Collapsin Response Mediator) proteins in Sema3A signaling pathway. In addition, the gene set Regulation of Insulin Secretion passed the threshold for inclusion. The genes which constitute these eight pathways had upregulated expression in the brain relative to the rest of the protein coding genome, with the anterior cingulate cortex the most highly enriched region after multiple testing correction, $P_{Adj}$=6.45×10$^{-13}$. Conversely, they were downregulated ($P_{Adj}<0.05$) in several peripheral tissues including the stomach and skin (FIG. 4). These genes were also overrepresented in the GWAS catalogue for traits relevant to psychiatry including schizophrenia, post-traumatic stress disorder, nicotine dependence and cognitive performance ($P_{Adj}<0.05$, Table 4).

TABLE 3

Pathways enriched with common variation associated with schizophrenia with putative clinical actionability

| Pathway* | P threshold ($P_T$) | P# |
|---|---|---|
| NOS1 pathway | All SNPs | 6.3 × 10$^{-4}$ |
| Regulation of insulin secretion | P < 0.5 | 3.9 × 10$^{-4}$ |
| CRMPs in Sema3A signalling | P < 0.5 | 9.4 × 10$^{-4}$ |
| GABA synthesis, release, reuptake and degradation | P < 0.5 | 5.8 × 10$^{-4}$ |
| One carbon pool by folate | P < 0.05 | 1.4 × 10$^{-4}$ |
| Hedgehog signalling | P < 0.05 | 1.9 × 10$^{-4}$ |

TABLE 3-continued

Pathways enriched with common variation associated with schizophrenia with putative clinical actionability

| Pathway* | P threshold ($P_T$) | P# |
|---|---|---|
| HIF-2 pathway | P < 0.005 | 3.1 × 10$^{-5}$ |
| Acetylcholine binding and downstream events | P < 0.005 | 3.8 × 10$^{-4}$ |

*Pathways with putative clinical actionability by virtue of having targets for existing drugs with potential for repurposing.
Enrichment P values for gene-level aggregated SNPs associated with schizophrenia in the PGC GWAS.

TABLE 4

Overrepresentation of genes within candidate PES pathways in the GWAS catalogue traits with relevance to psychiatry

| Phenotype | Overlap | Adjusted P-value |
|---|---|---|
| Nicotine dependence | 7 | 4.28 × 10$^{-8}$ |
| Smoking behaviour | 5 | 8.95 × 10$^{-5}$ |
| Schizophrenia | 18 | 0.0023 |
| Excessive daytime sleepiness | 2 | 0.017 |
| Post-traumatic stress disorder | 2 | 0.021 |
| Hippocampal volume | 2 | 0.024 |
| PGC cross disorder | 3 | 0.033 |
| Cognitive performance | 4 | 0.034 |
| White matter hyperintensity burden | 2 | 0.035 |
| Night sleep phenotypes | 10 | 0.036 |
| Social communication problems | 2 | 0.044 |
| Cerebral amyloid deposition in APOEε4 non-carriers (PET imaging) | 2 | 0.044 |

The eight gene-sets prioritized by our pipeline are indicative of a diverse range of drug classes. We sought to investigate a selection of candidate pharmacological agents that may be utilized for each PES input pathway. Firstly, we extracted the genes classified in the TCRD as $T_{Clin}$ from each of the gene-sets and matched them to their known drug-interactions using the drug gene interaction database (DGidb v3.02, Table 5). The top FDA approved drug per pathway was selected based on the DGidb score of interaction confidence between a Tan gene and drug. After annotation via the anatomical chemical (ATC) classification system two candidate drugs were anti-neoplastic and immunomodulation agents (ATC=L), two were classified as nervous system (ATC=N), whilst the remaining encompassed one of the following: blood and blood forming organs (ATC=B), musculoskeletal system (ATC=M), sensory organs (ATC=S) and alimentary tract and metabolism (ATC=A). Clinical trials for schizophrenia either completed or in the recruiting phase, were registered for three of these compounds—glycine, varenicline and exenatide.

TABLE 5

Highest confidence drug interaction between of a member of each pathway enriched with common polygenic risk for schizophrenia

| Pathway | Drug* | ATC Code | ATC Code Level 4 |
|---|---|---|---|
| NOS1 | Glycine | B05CX03 | Other irrigating solutions |
| GABA | Baclofen | M03BX01 | Other centrally acting agents# |
| CRMPs Sema3A | Dasatinib | L01XE06 | Protein kinase inhibitors |
| HIF-2 | Sunitinib | L01XE04 | Protein kinase inhibitors |
| Acetylcholine | Varenicline | N07BA03 | Drugs used in nicotine dependence |
| Hedgehog | Tacrine | N06DA01 | Anticholinesterases |

TABLE 5-continued

Highest confidence drug interaction between of a member of each pathway enriched with common polygenic risk for schizophrenia

| Pathway | Drug* | ATC Code | ATC Code Level 4 |
|---|---|---|---|
| Folate | Trifluridine | S01AD02 | Antivirals |
| Insulin | Exenatide | A10BJ01 | Glucagon-like-peptide-1 (GLP-1) analogue |

*Drugs selected by highest confidence interaction score with a gene (classified as $T_{Clin}$) in each of the pathways by DGidb v3.02.
Muscle relaxant.

Drugs that target a statistically significant number of genes in each pathway were derived using overrepresentation analysis in WebGestalt. Of the eight gene-sets tested, six had a significant drug enrichment with a minimum overlap of three genes after multiple testing correction (Table 6, Table 7). Nervous system drugs were the most common ATC category (level 1) across all the input pathways. This accorded with previous reports in the literature of schizophrenia associated common variant enrichment in the targets of antiepileptic agents (Gaspar et al., 2017, *Scientific Reports*, 7: 12460). Some interesting repurposing candidates with previous clinical trials in the disorder included the psychostimulant Atomoxiene (Kelly et al, 2009, *Journal of Clinical Psychiatry*, 70: 518-525), which targets the NOS1 pathway, the α4β2 nicotinic acetylcholine receptor subtype partial agonist Varenicline (Smith et al., 2016, *Plos One*, 11: e0143490-e0143490), and ascorbic acid (Vitamin C; Dakhale et al., 2005, *Psychopharmacology (Berlin)*, 182: 494-498). Whilst the results of these trials were mixed, targeting such interventions to specific individuals based on genomic risk is yet to be investigated.

TABLE 6

The top enriched drug target for each pharmagenic enrichment score pathway with at least three interacting genes after multiple testing correction

| Pathway | Top Drug* | Overlap# | ATC Code |
|---|---|---|---|
| NOS1 | Milnacipran | 5 | Other antidepressants |
| GABA | Temazepam | 14 | Benzodiazepine derivatives |
| Insulin | Clodronic acid | 3 | Bisphosphonates |
| HIF-2 | Ascorbic acid (Vitamin C) | 3 | Ascorbic acid (Vitamin C) |
| Acetylcholine | Nicotine | 11 | Drugs used in nicotine dependence |
| Folate | Tetrahydrofolic acid | 11 | Folic acid and derivatives |

*Most significantly associated drug after multiple testing correction, when corrected P values were equal, the drug with the highest gene set overlap was selected.
Number of genes targeted by the drug in the candidate pathway.

TABLE 7

Enriched targets for each pharmagenic enrichment score pathways with at least three interacting genes after multiple testing correction

| PES pathway | DrugBank ID | Drug name |
|---|---|---|
| NOS1 | DB06741 | Gavestinel |
| NOS1 | DB04896 | Milnacipran |
| NOS1 | DB00289 | Atomoxetine |
| NOS1 | DB06738 | Ketobemidone |
| NOS1 | DB00996 | Gabapentin |
| NOS1 | DB01174 | Phenobarbital |
| NOS1 | DB01520 | Tenocyclidine |
| NOS1 | DB00454 | Pethidine |
| NOS1 | DB00418 | Secobarbital |
| NOS1 | DB02868 | 3"-(Beta-Chloroethyl)-2", 4"-Dioxo-3, 5"-Spiro-Oxazolidino-4-Deacetoxy-Vinblastine |
| NOS1 | DB06151 | Acetylcysteine |
| NOS1 | DB00659 | Acamprosate |
| NOS1 | DB00312 | Pentobarbital |
| NOS1 | DB01429 | Aprindine |
| NOS1 | DB03977 | N-Trimethyllysine |
| NOS1 | DB04825 | Prenylamine |
| NOS1 | DB08039 | (3Z)-N,N-DIMETHYL-2-OXO-3-(4,5,6,7-TETRAHYDRO-1H-INDOL-2-YLMETHYLIDENE)-2,3-DIHYDRO-1H-INDOLE-5-SULFONAMIDE |
| NOS1 | DB01708 | Dehydroepiandrosterone |

TABLE 7-continued

Enriched targets for each pharmagenic enrichment score pathways with at least three interacting genes after multiple testing correction

| PES pathway | DrugBank ID | Drug name |
|---|---|---|
| NOS1 | DB00527 | Cinchocaine |
| NOS1 | DB00623 | Fluphenazine |
| NOS1 | DB00850 | Perphenazine |
| NOS1 | DB04513 | N-(6-Aminohexyl)-5-Chloro-1-Naphthalenesulfonamide |
| NOS1 | DB01043 | Memantine |
| NOS1 | DB01100 | Pimozide |
| NOS1 | DB03900 | 2-Methyl-2-Propanol |
| NOS1 | DB04841 | Flunarizine |
| NOS1 | DB08231 | Myristic acid |
| NOS1 | DB00831 | Trifluoperazine |
| NOS1 | DB00836 | Loperamide |
| NOS1 | DB00925 | Phenoxybenzamine |
| NOS1 | DB01115 | Nifedipine |
| NOS1 | DB01065 | Melatonin |
| NOS1 | DB01244 | Bepridil |
| NOS1 | DB01373 | Calcium |
| NOS1 | DB01069 | Promethazine |
| NOS1 | DB00142 | L-Glutamic Acid |
| NOS1 | DB01023 | Felodipine |
| NOS1 | DB00949 | Felbamate |
| NOS1 | DB02527 | Cyclic Adenosine Monophosphate |
| NOS1 | DB00622 | Nicardipine |
| NOS1 | DB00753 | Isoflurane |
| NOS1 | DB00477 | Chlorpromazine |
| NOS1 | DB01173 | Orphenadrine |
| NOS1 | DB00163 | Vitamin E |
| GABA | DB00186 | Lorazepam |
| GABA | DB00189 | Ethchlorvynol |
| GABA | DB00228 | Enflurane |
| GABA | DB00231 | Temazepam |
| GABA | DB00237 | Butabarbital |
| GABA | DB00241 | Butalbital |
| GABA | DB00273 | Topiramate |
| GABA | DB00292 | Etomidate |
| GABA | DB00306 | Talbutal |
| GABA | DB00312 | Pentobarbital |
| GABA | DB00349 | Clobazam |
| GABA | DB00371 | Meprobamate |
| GABA | DB00402 | Eszopiclone |
| GABA | DB00404 | Alprazolam |
| GABA | DB00463 | Metharbital |
| GABA | DB00475 | Chlordiazepoxide |
| GABA | DB00546 | Adinazolam |
| GABA | DB00628 | Clorazepate |
| GABA | DB00659 | Acamprosate |
| GABA | DB00683 | Midazolam |
| GABA | DB00690 | Flurazepam |
| GABA | DB00753 | Isoflurane |
| GABA | DB00794 | Primidone |
| GABA | DB00801 | Halazepam |
| GABA | DB00818 | Propofol |
| GABA | DB00829 | Diazepam |
| GABA | DB00842 | Oxazepam |
| GABA | DB00897 | Triazolam |
| GABA | DB01028 | Methoxyflurane |
| GABA | DB01049 | Ergoloid |
| GABA | DB01068 | Clonazepam |
| GABA | DB01107 | Methyprylon |
| GABA | DB01159 | Halothane |
| GABA | DB01189 | Desflurane |
| GABA | DB01205 | Flumazenil |
| GABA | DB01215 | Estazolam |
| GABA | DB01236 | Sevoflurane |
| GABA | DB01437 | Glutethimide |
| GABA | DB01558 | Bromazepam |
| GABA | DB01559 | Clotiazepam |
| GABA | DB01567 | Fludiazepam |
| GABA | DB01588 | Prazepam |
| GABA | DB01589 | Quazepam |
| GABA | DB01594 | Cinolazepam |
| GABA | DB01595 | Nitrazepam |
| GABA | DB01708 | Dehydroepiandrosterone |
| GABA | DB11582 | Thiocolchicoside |
| GABA | DB00543 | Amoxapine |

TABLE 7-continued

Enriched targets for each pharmagenic enrichment score pathways with at least three interacting genes after multiple testing correction

| PES pathway | DrugBank ID | Drug name |
|---|---|---|
| GABA | DB00334 | Olanzapine |
| GABA | DB05087 | Ganaxolone |
| GABA | DB00898 | Ethanol |
| GABA | DB00849 | Methylphenobarbital |
| GABA | DB01351 | Amobarbital |
| GABA | DB01352 | Aprobarbital |
| GABA | DB01353 | Butethal |
| GABA | DB01354 | Heptabarbital |
| GABA | DB01355 | Hexobarbital |
| GABA | DB01483 | Barbital |
| GABA | DB01496 | Barbituric |
| GABA | DB00599 | Thiopental |
| GABA | DB01544 | Flunitrazepam |
| GABA | DB00418 | Secobarbital |
| GABA | DB01198 | Zopiclone |
| GABA | DB00425 | Zolpidem |
| GABA | DB01381 | Ginkgo |
| GABA | DB01587 | Ketazolam |
| GABA | DB00466 | Picrotoxin |
| GABA | DB01346 | Quinidine |
| Insulin | DB00720 | Clodronate |
| Insulin | DB00661 | Verapamil |
| HIF-2 | DB00126 | Vitamin C |
| Acetylcholine | DB00184 | Nicotine |
| Acetylcholine | DB00674 | Galantamine |
| Acetylcholine | DB00898 | Ethanol |
| Acetylcholine | DB05740 | RPI-78M |
| Acetylcholine | DB01273 | Varenicline |
| Acetylcholine | DB09028 | Cytisine |
| Acetylcholine | DB00514 | Dextromethorphan |
| Acetylcholine | DB00849 | Methylphenobarbital |
| Acetylcholine | DB01351 | Amobarbital |
| Acetylcholine | DB01352 | Aprobarbital |
| Acetylcholine | DB01353 | Butethal |
| Acetylcholine | DB01354 | Heptabarbital |
| Acetylcholine | DB01355 | Hexobarbital |
| Acetylcholine | DB01483 | Barbital |
| Acetylcholine | DB01496 | Barbituric acid |
| Acetylcholine | DB00599 | Thiopental |
| Acetylcholine | DB01174 | Phenobarbital |
| Acetylcholine | DB01090 | Pentolinium |
| Acetylcholine | DB01227 | Levomethadyl |
| Acetylcholine | DB00418 | Secobarbital |
| Acetylcholine | DB00237 | Butabarbital |
| Acetylcholine | DB00241 | Butalbital |
| Acetylcholine | DB00306 | Talbutal |
| Acetylcholine | DB00463 | Metharbital |
| Acetylcholine | DB00794 | Primidone |
| Acetylcholine | DB00312 | Pentobarbital |
| Folate | DB00116 | Tetrahydrofolic acid |
| Folate | DB00642 | Pemetrexed |

Example 4

Individual Profiling of Pharmagenic Enrichment Scores in a Schizophrenia Cohort

In this study, a tiered system was implemented to define members of the cohort with a high PES score in a clinically actionable gene set. Firstly, individuals in the top percentile of the ASRB cohort were examined to explore the phenotypic characteristics of an elevated risk score with high confidence. There were 55 individuals with a top percentile PES, as one schizophrenia case had elevated PES in both the One Carbon Pool by Folate and the GABA synthesis, release, reuptake and degradation pathways. From this subset, the majority were schizophrenia patients (N=38), however, there was no significant association between top percentile status and diagnosis (z=0.975, P=0.33). Clinical characteristics obtained for ASRB participants were investigated to prioritize top percentile PES carriers who may benefit most from a personalized treatment regime. Three variables were selected as a proxy of a more clinically challenging presentation of the disorder: clozapine prescription (as a surrogate for treatment resistance), a global assessment of functioning (GAF) score <50, and an adolescent onset of the disorder before the age of 18. Interestingly, of the 38 schizophrenia cases with an elevated PES, 71% of this subset meet at least one of these criteria (N=27): clozapine prescription (N=9), GAF<50 (N=12), onset age <18 (N=9).

In addition, two less stringent partitions of elevated PES were implemented, specifically; a decile and quartile cut-off for PES in the entire cohort was used to triage patients at elevated risk of dysfunction in that pathway. The highest number of PES in the top decile or quartile respectively for an individual was six (FIG. 5). An increasing number of PES in both the top quartile (P=0.0287, OR=1.1493 [95% CI: 1.016-1.303]) and decile (P=0.0384, OR=1.207 [95% CI: 1.013-1.447]) was associated with schizophrenia. However, this signal is not significant after adjustment for $PRS_{Total}$. As visualized with kernel density estimation in FIG. 6, there is evidence of skew towards high $PRS_{Total}$ for those individuals with at least four top quartile or decile PES scores. Whilst the aim of this study was not to find association with cases for this cohort, two PES were nominally associated with schizophrenia in the ASRB—Regulation of Insulin Secretion (z=2.262, P=0.0237) and the Acetylcholine Binding and Downstream Events pathways (z=2.167, P=0.0303). However, significance was diminished when covaried for total schizophrenia PRS ($PRS_{Total}$, P>0.05).

Example 5

Relationship Between Pathway-Based Annotation and Genome Wide Polygenic Risk for Schizophrenia Pairwise correlation between each of the scores demonstrated no significant univariate relationship between any PES or with $PRS_{Total}$ (FIG. 6). In addition, top percentile PES individuals were not enriched with $PRS_{Total}$ in comparison to the rest of the cohort: z=0.819, P=0.413 (FIG. 6). This presented a clinically significant subset of schizophrenia cases with a less polygenic phenotype, that is, low $PRS_{Total}$ relative to the schizophrenia cohort but high heritable risk in one or more pathways. Analysis of the bottom quartile of $PRS_{Total}$ in the ASRB schizophrenia cohort revealed cases (N=10) with top percentile PES but depleted $PRS_{Total}$. The pathways encompassed in these individuals were Acetylcholine (N=3), Hedgehog signaling (N=2), CRMPs in Sema3A (N=2), GABA (N=1), HIF-2 (N=1) and Insulin secretion (N=1). This information may be of great clinical value as these cases have less marked common variant burden genome-wide, but localized risk in a gene set. Furthermore, three of these patients were prescribed clozapine (surrogate for treatment resistance), a further three had low global functioning (GAF<50), along with two adolescent onset cases—potentially highlighting a heightened need precision intervention in these individuals.

To investigate the relationship between low polygenic load and elevated PES, in the schizophrenia cohort genome wide PRS and the count of PES in the top decile per individual were clustered using finite Gaussian mixture modelling (GMM). The optimal number of clusters was selected based on parametrization of the covariance matrix utilizing the Bayesian Information Criterion (BIC), with the highest BIC value used for selection of the number of clusters (FIG. 7). Four clusters were derived from the data (BIC=13871.21, VEV: variable volume, equal shape, variable orientation) (FIG. 7). Clusters were ellipsoidal, with the volume of the ellipsoid, shape of the density contours, and orientation of the corresponding ellipsoid also determined by the covariance matrix. The first two clusters were comprised of schizophrenia patients with at least one PES in the top decile of the ASRB cohort, with Cluster 1 having low $PRS_{Total}$ relative to Cluster 2. The third and fourth clusters had no elevated PES but Cluster 3 represents patients with greater polygenic load that is $PRS_{Total}$, than the Cluster 4. The distribution of $PRS_{Total}$ in Cluster 1 reinforces the concept that a subset of schizophrenia patients with lower polygenic risk may have concentrated elevation in one or more specific biological systems. Analogous to its univariate relationship with $PRS_{Total}$ individuals with extreme PES in the top percentile of the ARSB cohort were not enriched in any of the GMM clusters relative to the largest cluster, Cluster 2 (Cluster 2 vs Cluster 1: P=0.668; Cluster 2 vs Cluster 3: P=0.492; Cluster 2 vs Cluster 4: P=0.977).

Example 6

Clinically Actionable Pathways Enriched with Common Variant Risk in Type I Diabetes We profiled PES in a cohort of Type I diabetes patients (N=9934) and screened healthy controls (N=16956) from a meta-analysis of genome wide SNP datasets compiled by Bradford et al. (*PloS Genetics*, 2011, 7(9): e1002293). Gene-set association was undertaken on filtered pathways at four $P_T$ ($P_T<1$, $P_T<0.5$, $P_T<0.05$, $P_T<0.005$). The most significantly associated gene-set was ABC Transporters (P=5.82×10¹⁰, β=2.01, SE=0.329, $P_T<0.005$). Gene-sets which were most significant at each $P_T$ assessed are provided in Table 8.

TABLE 8

Top clinically actionable pathways enriched with common variation associated with type I diabetes at each $P_T$

| Pathway | P threshold ($P_T$) | P |
|---|---|---|
| Intestinal immune network for IgA production | All SNPs | $1.15 \times 10^{-5}$ |
| CD8 TCR downstream pathway | P < 0.5 | $1.68 \times 10^{-8}$ |
| Autoimmune thyroid disease | P < 0.05 | $1.61 \times 10^{-7}$ |
| ABC transporters | P < 0.005 | $5.82 \times 10^{-10}$ |

The highest confidence target-drug interaction (FDA approved) was sourced from DGIdb v 3.0.2 for each geneset (Table 9). Abatacept, an immunosuppressant indicated for the treatment of other autoimmune disorders, including rheumatoid arthritis, was the most confident interaction for two pathways (IgA Production and ABC Transporters). A type II diabetes drug, Gilbenclamide, was prioritized for the ABC Transporter system. Drugs that target a statistically significant number of genes in each pathway were derived using overrepresentation analysis in WebGestalt. Two of these genesets has at least one statistically significant overrepresentation of drug targets after multiple testing correction, with Gilbenclamide once more prioritized for the ABC Transporters pathway (Table 10).

TABLE 9

Highest confidence drug interaction between members of each pathway enriched with common polygenic risk for type I diabetes

| Pathway | Drug | ATC Code | ATC Code Level 4 |
|---|---|---|---|
| IgA production | Abatacept | L04AA24 | Selective Immunosuppressant |
| CD8 TCR Downstream | Vemurafenib | L01XE15 | Protein kinase inhibitors |

TABLE 9-continued

Highest confidence drug interaction between members of each pathway
enriched with common polygenic risk for type I diabetes

| Pathway | Drug | ATC Code | ATC Code Level 4 |
|---|---|---|---|
| Autoimmune thyroid | Abatacept | L04AA24 | Selective Immunosuppressant |
| ABC transporters | Gilbenclamide | A10BB01 | Sulfonylureas |

TABLE 10

The top enriched drug target for each pharmagenic enrichment score pathway with at least three interacting genes after multiple testing correction

| Pathway | Top drug | Overlap* | ATC Code Level 4 |
|---|---|---|---|
| CD8 TCR Downstream | Aldesleukin | 3 | Interleukins |
| ABC transporters | Gilbenclamide | 5 | Sulfonylureas |

*Overlap refers to the number of genes targeted by the drug in the candidate pathway.

Example 7

Clinically Actionable Pathways Enriched with Common Variant Risk in Major Depressive Disorder Major Depressive Disorder (MDD) is a neuropsychiatric syndrome characterized by persistently depressed mood. We profiled PES in a cohort of MDD patients (N=135,458) and screened healthy controls (N=344,901) using genome wide summary statistics from the psychiatric genomics consortium 2018 mega-GWAS (Wray et al., 2018, *Nature Genetics*, 50(5): 668-681). Gene-set association was undertaken on filtered pathways at four $P_T$ ($P_T<1$, $P_T<0.5$, $P_T<0.05$, $P_T<0.005$). The most significantly associated geneset was Abacavir transport and metabolism (P=3.81×10$^{-5}$, β=0.605, SE=0.0178, $P_T<0.005$). Gene-sets which were most significant at each $P_T$ assessed are provided in Table 11.

TABLE 11

Top clinically actionable pathways enriched with common variation associated with MDD at each $P_T$

| Pathway | P threshold ($P_T$) | P |
|---|---|---|
| GABA pathway | All SNPs | 1.1 × 10$^{-3}$ |
| MAPK signalling | P < 0.5 | 1.04 × 10$^{-3}$ |
| Signalling by FGFR mutants | P < 0.05 | 3.91 × 10$^{-5}$ |
| Abacavir transport and metabolism | P < 0.005 | 3.91 × 10$^{-5}$ |

DGIdb derived drug-gene interactions for each candidate pathway resulted in the prioritization of two protein kinase inhibitors (dasatinib and vemurafenib) and two immune related drugs (cetuximab and ribavirin) (Table 12). Drugs that target a statistically significant number of genes in each pathway were derived using overrepresentation analysis in WebGestalt. Three of the genesets had at least one statistically significant multi-gene/drug interaction (Table 13).

TABLE 12

Highest confidence drug interaction between members of each pathway enriched with common polygenic risk for MDD

| Pathway | Drug | ATC Code | ATC Code Level 4 |
|---|---|---|---|
| GABA | Dasatinib | L01XE06 | Protein kinase inhibitors |
| MAPK | Vemurafenib | L01XE15 | Protein kinase inhibitors |
| FGFR mutants | Cetuximab | L01XC06 | Monoclonal antibodies |
| Abacavir | Ribavirin | J05AP01 | Antivirals for treatment of HCV infections |

TABLE 13

The top enriched drug target for each pharmagenic enrichment score pathway with at least three interacting genes after multiple testing correction

| Pathway | Top drug | Overlap | ATC Code Level 4 |
|---|---|---|---|
| GABA | Methylphenobarbital | 6 | Barbiturates and derivatives |
| MAPK | Spironolactone | 17 | Aldosterone agonists |
| FGFR mutants | Ponatinib | 5 | Protein kinase inhibitors |

Example 8

Clinically Actionable Pathways Enriched with Common Variant Risk in Multiple Sclerosis We profiled PES in a cohort of multiple sclerosis patients (N=9772) and screened healthy controls (N=17376) using publically available genome wide summary statistics prepared by the Wellcome Trust Case Control Consortium 2 (WTCCC2) and the International Multiple Sclerosis Genetics Consortium (IMSGC) (*Nature*, 2011, 47(7359): 214-219). Gene-set association was undertaken on filtered pathways at four $P_T$ ($P_T<1$, $P_T<0.5$, $P_T<0.05$, $P_T<0.005$). The most significantly associated geneset was the Glutathione Metabolism pathway (P=1.15×10$^{-17}$, β=4.44, SE=0.121, $P_T<0.005$). Gene-sets which were most significant at each $P_T$ assessed are provided in Table 14.

TABLE 14

Top clinically actionable pathways enriched with common variation associated with multiple sclerosis at each $P_T$

| Pathway | P threshold ($P_T$) | P |
|---|---|---|
| IL-2 STAT4 pathway | All SNPs | 1.89 × 10$^{-9}$ |
| IL-6 JAK STAT3 signalling | P < 0.5 | 1.48 × 10$^{-8}$ |
| IL-2RB pathway | P < 0.05 | 1.97 × 10$^{-8}$ |
| Glutathione pathway | P < 0.005 | 1.15 × 10$^{-17}$ |

DGIdb derived drug-gene interactions for each candidate pathway resulted in the prioritization of four distant drugs (Table 15). Drugs that target a statistically significant number of genes in each pathway were derived using overrepresentation analysis in WebGesalt. All has at least one statistically significant multi-gene/drug interaction, with the top drugs having an immune relationship (Table 16).

TABLE 15

Highest confidence drug interaction between members of each pathway enriched with common polygenic risk for MDD

| Pathway | Drug | ATC Code | ATC Code Level 4 |
|---|---|---|---|
| IL-2/STAT4 | Proxyphylline | R03DA03 | Xanthines |
| IL-6/JAK/STAT3 | Infliximab | L04AB02 | TNF-alpha inhibitors |
| IL-2RB | Yohimbine | G04BE04 | Drugs used in erectile dysfunction |
| Glutathione | Gemcitabine | L01BC | Pyrimidine analogues |

TABLE 16

The top enriched drug target for each pharmagenic enrichment score pathway with at least three interacting genes after multiple testing correction

| Pathway | Top drug | Overlap | ATC Code Level 4 |
|---|---|---|---|
| IL-2/STAT4 | Muromonab | 4 | Selective immunosuppressant |
| IL-6/JAK/STAT3 | Sargramostim | 3 | Colony stimulating factors |
| IL-2RB | Aldesleukin | 3 | Interleukins |
| Glutathione | Glutathione | 30 | Antidotes |

DISCUSSION

Aggregation of common variation from schizophrenia GWAS into biological pathways with known drug interactions revealed a diverse array of systems relevant to eight distinct PES scores. These candidate pathways displayed common variant enrichment at a range of $P_T$, indicative of the degree of polygenicity, ranging from using all SNPs as input, to a significance threshold below 0.005 ($P_T<0.005$). While two of these pathways included GABAergic and cholinergic neurotransmission, both of which are intuitive candidates that have been extensively implicated in schizophrenia with associated drugs already in common practice for neuropsychiatric disorders, many others were more surprising. The most significantly associated gene-set pertained to the HIF-2 transcription factor network, an important mediator in response to decreases in available cellular oxygen. This has clear significance for biological mechanisms involved in psychiatric disorders, for example in dopaminergic signaling. Enrichment of ascorbic acid (vitamin C) targets in this pathway is notable from a therapeutic perspective because of its antioxidant capabilities, along with preliminary evidence for its efficacy as an adjuvant in the treatment of the disorder. The interaction between HIF-2 signaling and NOS1 signaling, another candidate pathway with pharmagenic enrichment in schizophrenia, is supported by previous evidence of redox dysfunction in the disorder (Olson et al., 2011, *Nitric Oxide: Biology and Chemistry/Official Journal of the Nitric Oxide Society*, 25: 125-137). The activity of glutamate receptors in the NOS1 system suggests that psycholeptics and psychoanaleptics are likely to modulate this pathway. The inventors also observed common variant enrichment in two developmental pathways that can be pharmacologically modulated: CRMPs in semaphorin 3a signaling and Hedgehog signaling. The former is able to interact with the tyrosine kinase inhibitor Dasatinib, which is postulated to have neuroprotective properties (Wrasidlo et al., 2014, *British Journal of Pharmacology*, 171: 5757-5773). Enrichment in these actionable pathways is consistent with longstanding hypotheses of deficits in neurodevelopment contributing to the etiology of schizophrenia (Rapoport et al., 2012, *Molecular Psychiatry*, 17: 1228-1238).

The breadth of drugs that target these pathways used to construct PES suggests that individual level treatment formulation can become highly specific depending in which systems genomic risk is localized. This would include the stratification individuals for precision treatment with compounds previously tested on undifferentiated schizophrenia cohorts, including vitamin C, Atomoxiene, and Varenicline, which were identified using PES in this study. Repurposing drugs for individuals informed by their genetic liability may assist in the reduction of response heterogeneity, which hinders the implementation of novel treatments in very complex phenotypes like schizophrenia. The individuals with PES in the top percentile of any pathway, particularly those with low genome wide PRS, present as the most tractable candidates for this approach; the clinical significance of particular sets of common variant burden would be missed by an unannotated genome wide association indexed by total PRS alone.

Our approach was further validated in further complex disorders, including type I diabetes, MDD and multiple sclerosis. In each disorder, aggregation of common variation from GWAS into biological pathways with known drug interactions revealed a diverse array of systems relevant to distinct PES scores. These candidate pathways displayed common variant enrichment at a range of $P_T$, indicative of the degree of polygenicity, ranging from using all SNPs as input, to a significance threshold below 0.005 ($P_T<0.005$). These data demonstrate that the PES approach could provide a mechanism to integrate an individual's common variant risk to inform personalized interventions, including drug repurposing, for complex disorders such as schizophrenia, type I diabetes, MDD and multiple sclerosis.

The invention claimed is:

1. A method for treating a complex disorder in a human subject comprising:
  a. identifying one or more pharmacologically relevant biological pathways comprising the steps of:
   i. obtaining data representing genome-wide variants from a plurality of individuals with the complex disorder and a plurality of individuals without the complex disorder;
   ii. selecting a plurality of groups of variants significantly associated with the complex disorder, wherein each group of variants is identified using a plurality of P value thresholds ($P_T$);
   iii. performing gene set association analysis on each of the plurality of groups of variants to identify gene sets enriched for variants significantly associated with the complex disorder;
   iv. for each of the identified gene sets, generating a plurality of annotations corresponding to a plurality of predefined annotation categories, wherein the plurality of predefined annotation categories comprise a biological pathways annotation category, a drug target annotation category and a therapeutic agent annotation category;
   v. identifying one or more pharmacologically relevant biological pathways, wherein the pharmacologically relevant biological pathways comprise an annotated biological pathway, an annotated drug target and at least one annotated therapeutic agent;

b. selecting a therapeutic agent for the treatment of the complex disorder in the subject comprising the steps of:
  i. obtaining data representing genome-wide variants in a biological sample from the subject;
  ii. calculating a predictive polygenic score for the pharmacologically-relevant biological pathways identified in step (a)(v) from the subject's genome wide variants data using each of the plurality of $P_T$ in step (a)(ii); and
  iii. selecting at least one therapeutic agent for the treatment of the complex disorder, wherein a predictive polygenic score that is elevated relative to a reference value indicates that the subject may be sensitive to the at least one annotated therapeutic agent, and
c. treating the subject with the selected therapeutic agent.

2. The method of claim 1, wherein the data representing genome-wide variants is selected from the group consisting of single nucleotide polymorphism (SNP) genotype data, copy number variant (CNV) data, gene deletion data, gene inversion data, gene duplication data, splice variant data, haplotype data, or combinations thereof.

3. The method of claim 2, wherein the data representing genome-wide variants is a SNP genotype data.

4. The method of claim 1, wherein the data representing genome-wide variants is genome wide association study (GWAS) summary statistics.

5. The method of claim 1, wherein the variants are selected from the group consisting of common SNPs, CNV, gene deletions, gene inversions, gene duplications, splice variants and haplotypes associated with the complex disorder.

6. The method of claim 5, wherein the variants are SNPs.

7. The method of claim 1, wherein at least one $P_T$ identifies all variants associated with the complex disorder.

8. The method of claim 1, wherein the complex disorder is selected from the group consisting of diabetes, multiple sclerosis, schizophrenia, bipolar disorder, attention-deficit hyperactivity disorder, major depressive disorder, obsessive compulsive disorder, eating disorder, inflammatory disorder, autoimmune disorder, metabolic disorder, cardiovascular disease and cancer.

9. The method of claim 8, wherein the complex disorder is selected from the group consisting of diabetes, multiple sclerosis, schizophrenia, bipolar disorder, attention-deficit hyperactivity disorder, major depressive disorder, obsessive compulsive disorder and eating disorder.

10. The method of claim 9, wherein the complex disorder is schizophrenia.

11. The method of claim 1, wherein the predefined biological pathways annotation category is derived from the Molecular Signatures Database (MSigDB).

12. The method of claim 1, wherein the predefined drug target annotation category is derived from the Target Central Resource Database (TCRD).

13. The method of claim 1, wherein the predefined therapeutic agent annotation category is derived from the DrugCentral Database.

14. The method of claim 1, wherein the gene set association analysis comprises the mapping of variants to protein coding genes.

15. The method of claim 14, wherein the variant is mapped within about 5 kb upstream and about 1.5 kb downstream of the protein coding gene.

16. The method of claim 15, wherein variants mapped to protein coding genes within the major histocompatibility complex (MHC) region are excluded.

17. The method of claim 1, wherein the identification of one or more pharmacologically-relevant biological pathways further comprises an enrichment analysis for each gene set with overrepresentation analysis.

18. A method for preventing a complex disorder in a subject at risk of developing the complex disorder comprising:
a. identifying one or more pharmacologically relevant biological pathways comprising the steps of:
  i. obtaining data representing genome-wide variants from a plurality of individuals with the complex disorder and a plurality of individuals without the complex disorder;
  ii. selecting a plurality of groups of variants significantly associated with the complex disorder, wherein each group of variants is identified using a plurality of P value thresholds ($P_T$);
  iii. performing gene set association analysis on each of the plurality of groups of variants to identify gene sets enriched for variants significantly associated with the complex disorder;
  iv. for each of the identified gene sets, generating a plurality of annotations corresponding to a plurality of predefined annotation categories, wherein the plurality of predefined annotation categories comprise a biological pathways annotation category, a drug target annotation category, a therapeutic agent annotation category, a dietary supplement annotation category and a lifestyle intervention annotation category; and
  v. identifying one or more pharmacologically relevant biological pathways, wherein the pharmacologically relevant biological pathways comprise an annotated biological pathway and an annotated drug target;
b. selecting a prophylactic treatment to prevent the development of the complex disorder in the subject comprising the steps of:
  i. obtaining data representing genome-wide variants in a biological sample from the subject;
  ii. calculating a predictive polygenic score for the pharmacologically-relevant biological pathways identified in step (a)(v) from the subject's genome wide variants data using each of the plurality of $P_T$ in step (a)(ii); and
  iii. identifying the subject as being at risk of developing the complex disorder wherein a predictive polygenic score that is elevated relative to a reference value indicates that the subject may be at risk of developing the complex disorder, wherein the pharmacologically relevant biological pathways with a predictive polygenic score that is elevated relative to a reference value have at least one additional annotation selected from the group a therapeutic agent annotation, a dietary supplement annotation and a lifestyle intervention annotation, and
c. treating the subject with one or more of the annotated therapeutic agent, dietary supplement or lifestyle intervention to prevent the development of the complex disorder.

* * * * *